(12) United States Patent
Nakano

(10) Patent No.: US 6,322,450 B1
(45) Date of Patent: Nov. 27, 2001

(54) ENTERTAINMENT SYSTEM WITH TRANSFERABLE CALCULATOR PROGRAM

(75) Inventor: Takeshi Nakano, Suibara-machi (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/435,225

(22) Filed: Nov. 5, 1999

(30) Foreign Application Priority Data

Nov. 6, 1998 (JP) .................................................. 10-316460

(51) Int. Cl.[7] ...................................................... A63F 13/00
(52) U.S. Cl. .................................................. 463/40; 463/43
(58) Field of Search .................................. 463/31, 40, 41, 463/42, 43, 44, 8, 2, 46, 25, 22; 235/492, 441, 145 R

(56) References Cited

U.S. PATENT DOCUMENTS

| | | |
|---|---|---|
| 4,026,555 * | 5/1977 | Kirschner et al. . |
| 4,398,086 * | 8/1983 | Smith, III . |
| 4,475,164 | 10/1984 | Sado . |
| 4,491,324 * | 1/1985 | Yoshida . |
| 4,618,927 * | 10/1986 | Hatta . |
| 5,601,489 * | 2/1997 | Komaki .................................. 463/44 |
| 5,666,530 * | 9/1997 | Clark et al. . |
| 5,668,591 | 9/1997 | Shintani . |
| 5,884,323 * | 3/1999 | Hawkins et al. . |
| 5,974,238 * | 10/1999 | Chase, Jr. . |

OTHER PUBLICATIONS

Papier Oder Elektronen XP 000680785.
Sony To Develop "Personal Digital Assitants" XP–002131494.

* cited by examiner

Primary Examiner—Michael O'Neill
(74) Attorney, Agent, or Firm—Rosenman & Colin, LLP.

(57) ABSTRACT

A portable electronic device has an interface for connecting it to a parent machine that has the function of executing programs. The portable electronic device further including a program storage unit, a control unit that controls execution of the programs, a display that displays information according to the executed programs, an operation input unit for operating the programs, and a power supply unit that supplies power to each of those units. Information accompanying the execution of a calculator program is transferred from the parent machine to the portable electronic device, and it executes a calculator program stored in the program storage unit by the control unit based on the transferred information.

13 Claims, 26 Drawing Sheets

PROCESSING ON PARENT-MACHINE SIDE

ENTERTAINMENT SYSTEM WITH TRANSFERABLE CALCULATOR PROGRAM

FIELD OF THE INVENTION

This invention relates to a portable electronic device for an entertainment system. More specifically, the invention relates to technology for using as a calculator (desktop electronic calculator) a portable electronic device that can be connected to an information device such as a video game machine, functions as a memory card or other auxiliary memory device, and can be used independently.

BACKGROUND OF INVENTION

A conventional memory card (child machine or ancillary machine) that is used inserted into the main unit (parent machine or host machine) of an information device such as a video game machine, is constructed so as to have an interface for connecting with the parent device and a nonvolatile memory element for storing data.

FIG. 1A shows a composition of the main part of a memory card as one example of a memory device of a conventional portable electronic device. The conventional memory card 10 has a control unit 11 for controlling its operation, a connector 12 for connecting to a terminal provided in a slot of the parent machine, and a nonvolatile memory 16 for storing data. Connector 12 and nonvolatile memory 16 are connected to control unit 11.

Control unit 11 is constructed using, for example, a microprocessor (labeled as such in the diagram). As nonvolatile memory 16, an EEPROM or other flash memory may be used. For the connection interface with the main unit, a microprocessor is sometimes used as a control means for interpreting protocols.

FIG. 1B shows the control elements in control unit 11 of conventional memory card 10.

The conventional memory card 10 has had only a main unit connection interface 13 for connecting to the main unit, and a memory interface 14 for inputting and outputting data to and from the nonvolatile memory 16.

Also, a conventional video game device has the function of storing game data, etc. in an auxiliary memory device. The memory card 10 is used as an auxiliary memory device of such a video game device.

FIG. 2 shows an example of a conventional video game device 1 that uses a memory card 10 as an auxiliary memory device. Main unit 2 of the video game device 1 is housed in a roughly square-shaped housing and consists of a disk mounting unit 3 in the middle of which is mounted an optical disk that is a recording medium on which are recorded application programs for video games, a reset switch 4 for arbitrarily resetting the game, a power switch 5, a disk operation switch 6 for operating the mounting of said optical disk, and, for example, two slots 7A and 7B.

Memory card 10, which is used as an auxiliary memory device, is inserted into these slots 7A and 7B, and for example the results of games executed on video game device 1 are sent from a control device (CPU) 19 and are written into nonvolatile memory 16. The construction is such that multiple operation devices (controllers, not shown) can be connected to slots 7A and 7B, allowing multiple users to play a competitive game simultaneously.

SUMMARY OF THE INVENTION

It has been desired that a child machine that is connected using a memory card slot of a video game device that serves as the parent machine should have the function of executing the game and other programs. Such child machine can also be used as a portable electronic device as it is, and by facilitating communication with other devices, its range of applications is broadened, which will lead to the stimulation of new demand. In addition, it would be very convenient if such a portable electronic device could also be used as a calculator (desktop electronic calculator).

It is an object of this invention, which was devised in consideration of the above-described situation, to provide technology for using as a calculator a portable electronic device that can be connected to a parent machine and that can also be used as an individual child machine.

In order to achieve this and other objects, the portable electronic device of the present invention, which is a portable electronic device that has an interface for connecting it to a parent machine that has the function of executing programs, comprises a program storage means, a control means that controls execution of said programs, a display means that displays information according to said executed programs, an operation input means for operating said programs, and a power supply means that supplies power to each of said means, wherein information accompanying the execution of a calculator program is transferred from the parent machine to said portable electronic device, and it executes a calculator program stored in said program storage means by said control means based on this transferred information.

Also, in the portable electronic device of this invention, the calculator program stored in said program storage means is executed while the connection with said parent machine is being severed.

In addition, in the portable electronic device of this invention, said connected parent machine is a video game device, said calculator program is downloaded from the connected parent machine to said storage means, and this program is executed by said control means.

In addition, in the portable electronic device of this invention, said calculator program is recorded additionally on the optical disk recording medium on which game software is accumulated and which is mounted on said parent machine.

Furthermore, the characters of the number-specifying keys and operation keys and the numerical value characters of the calculation results which are displayed on said display means are distinguishable.

In addition, in the portable electronic device of this invention, the characters of the number-specifying keys and operation keys are displayed on said display means normally, while the numerical value characters of said calculation results are displayed in characters whose intensity is reversed.

Further, in the portable electronic device of this invention, the number-specifying keys, operation keys, and calculation results are displayed partially on the relatively small display screen of said display means, and the entire view can be displayed successively by scrolling said partial display.

DETAILED DESCRIPTION OF THE PREFERRED EMBODIMENTS

In the following, a preferred embodiment of this invention will be described with reference to the drawings. Here, the portable electronic device that is an embodiment of the present invention can be used as a memory card used in an entertainment system such as for example a video game device that serves as the parent machine, and as an independent portable small game machine. The entertainment system is not limited to a video game machine, and the portable electronic device that is the child machine need not necessarily have a memory card function.

In the following description, we first describe a parent machine in which a portable electronic device that is an embodiment of this invention is used as a child machine, taking a video game device as an example.

Figure 1A:
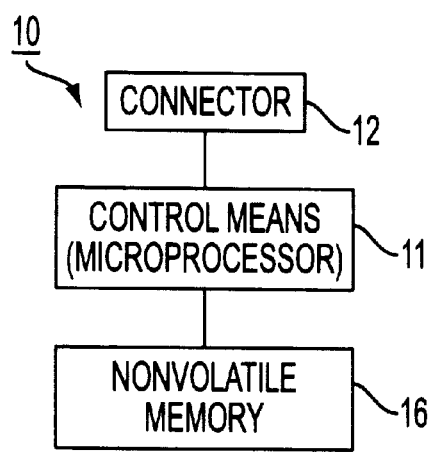
FIG. 1 is a diagram showing an example of the composition of the main part of an ordinary memory card.
Figure 1B:
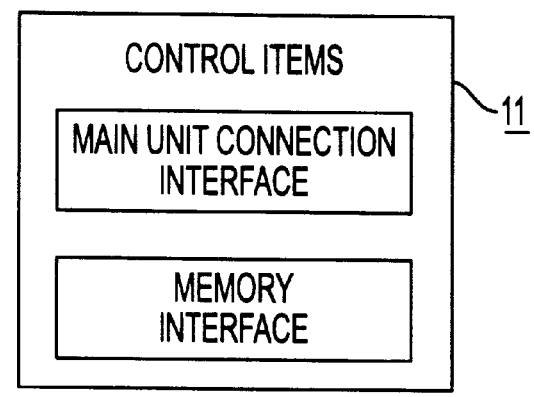
Figure 2:
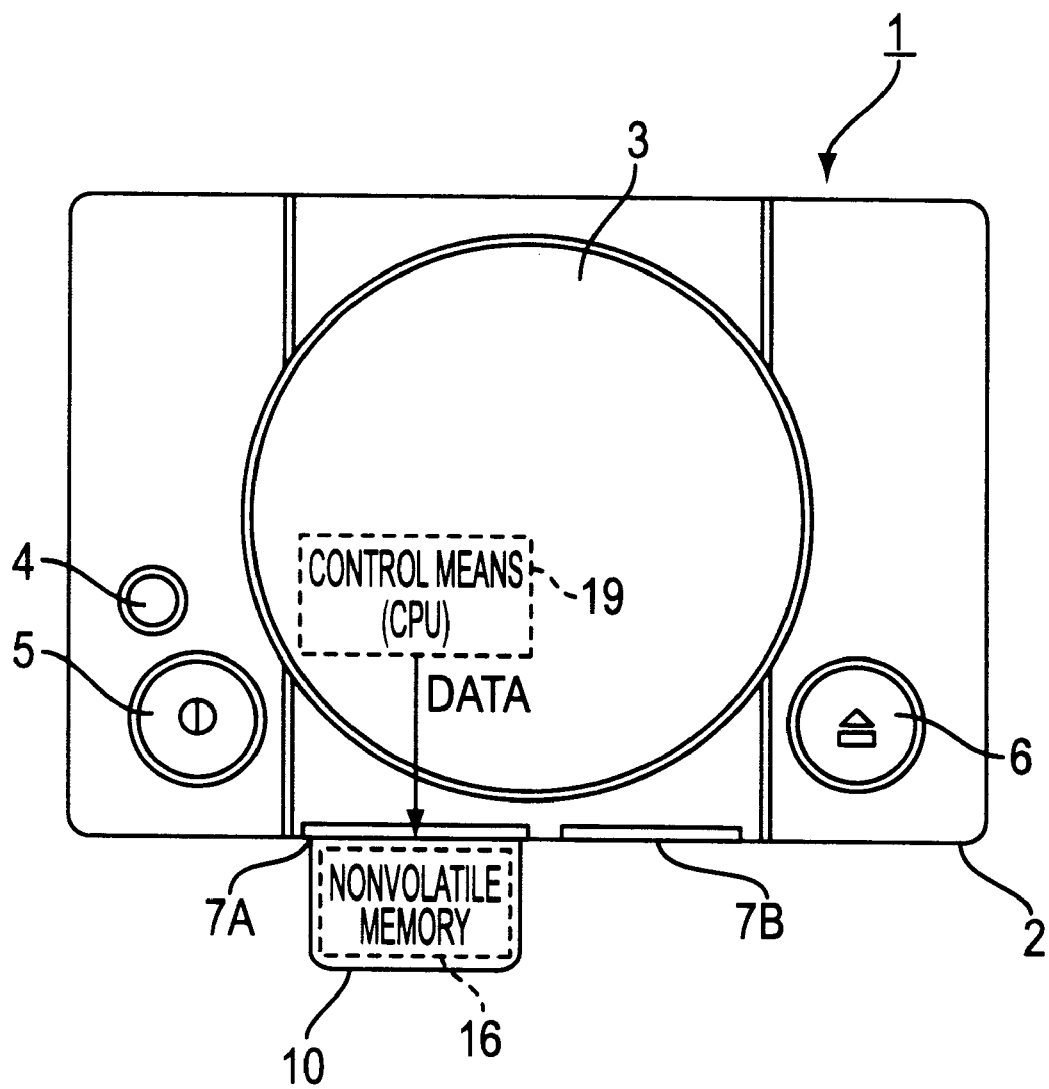
FIG. 2 is a diagram showing a video game device that uses a memory card as an auxiliary memory device.
Figure 3:
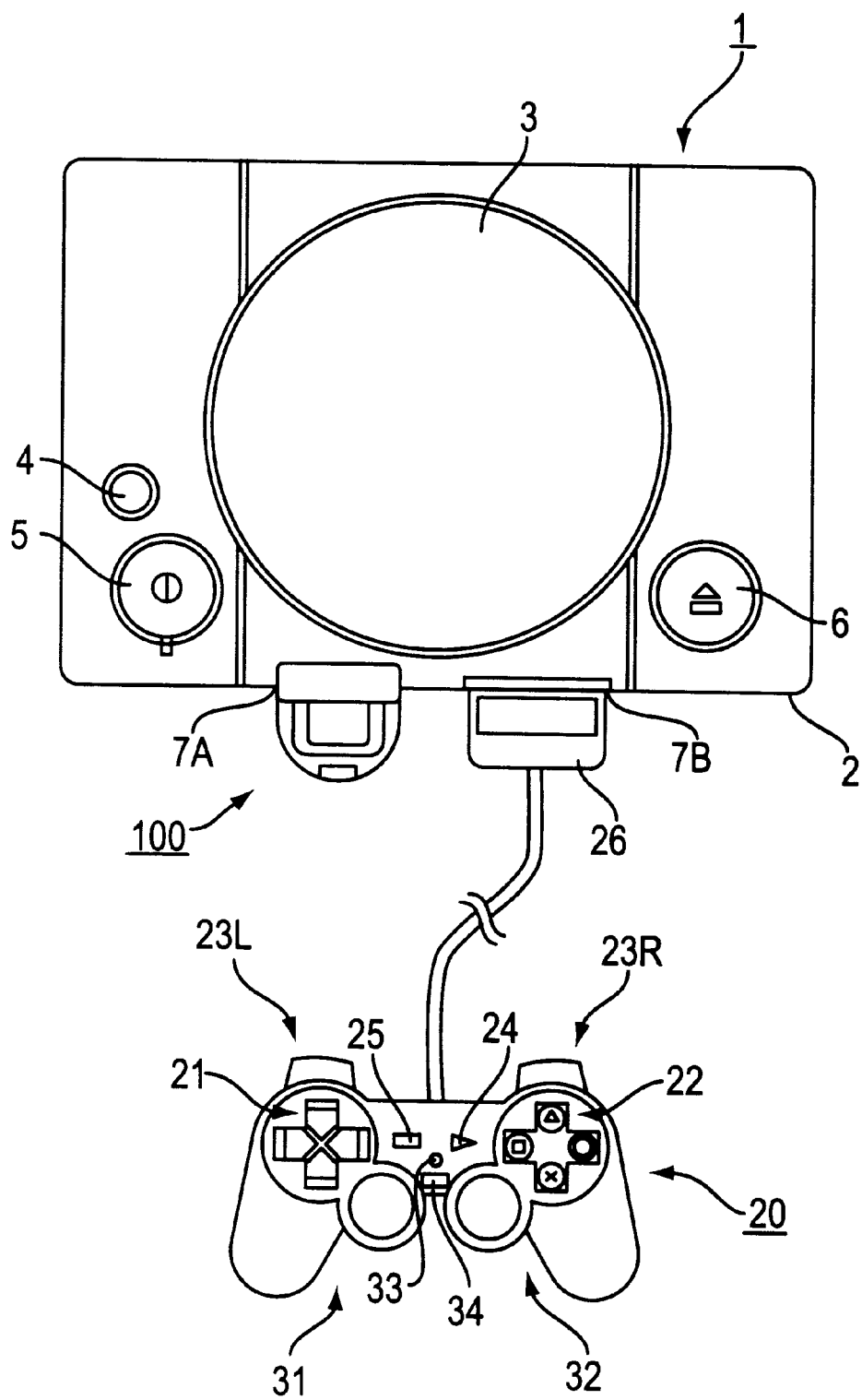
FIG. 3 is a plan view of an embodiment of a video game device as a parent machine in which a portable electronic device is used as a child machine.

FIG. 3 shows the appearance of a video game device on which is mounted a portable electronic device that is an embodiment of this invention. The video game device 1 is one for, for example, reading a game program recorded on an optical disk, etc. and executing it according to instructions from the user (game player). Execution of a game means mainly controlling the progress of the game, as well as the display and sound.

A main unit 2 of video game device 1 is accommodated in a roughly square-shaped housing and is constituted so as to have in its middle a disk mounting unit 3 on which is mounted a CD-ROM or other optical disk that is a recording medium for supplying video game and other application programs, as well as a reset switch 4 for arbitrarily resetting the game, a power switch 5, a disk operation switch 6 for operating the mounting of said optical disk, and, for example, two slots 7A and 7B.

The recording medium for supplying application programs is not limited to an optical disk, application programs may supplied via a communication circuit.

Slots 7A and 7B allow two operation devices 20 to be connected, and allow two users to play a competitive game against each other. Also, the memory card or a portable electronic device that is an embodiment of this invention can be inserted into these slots 7A and 7B. FIG. 3 shows an example of a structure in which two systems of slots 7A and 7B are provided, but this number is not limited to two systems.

Operation device or controller 20 has first and second operation parts 21 and 22, L [left] button 23L, R [right] button 23R, a start button 24, selection button 25, an analog-operable operation parts 31 and 32, a mode selection switch 33 by which one selects the operation mode of operation parts 31 and 32, and a display unit 34 for displaying the selected operation mode. Although not shown, a vibration-causing mechanism is provided inside operation device 20.

Figure 4:
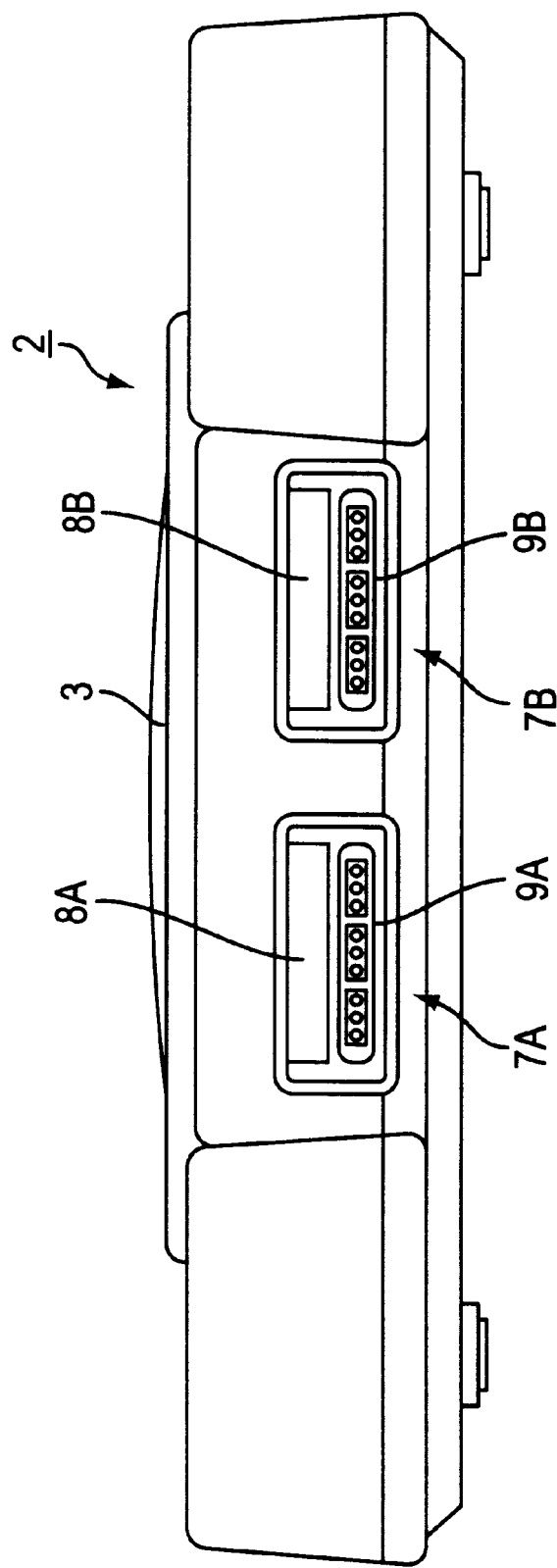
FIG. 4 is a rear view showing the slots of a video game device as a parent machine.

FIG. 4 shows the appearance of slots 7A and 7B provided on the rear side of main unit 2 of the video game device 1.

In this embodiment, slots 7A and 7B each are formed in two stages. Provided on the upper stage are memory card insertion units 8A and 8B, into which are inserted a memory card 10 or a portable electronic device 100, described below and provided on the lower stage are controller connection units (jacks) 9A and 9B, to which are connected connection terminal unit (connector) 26 of controller 20.

Figure 5:
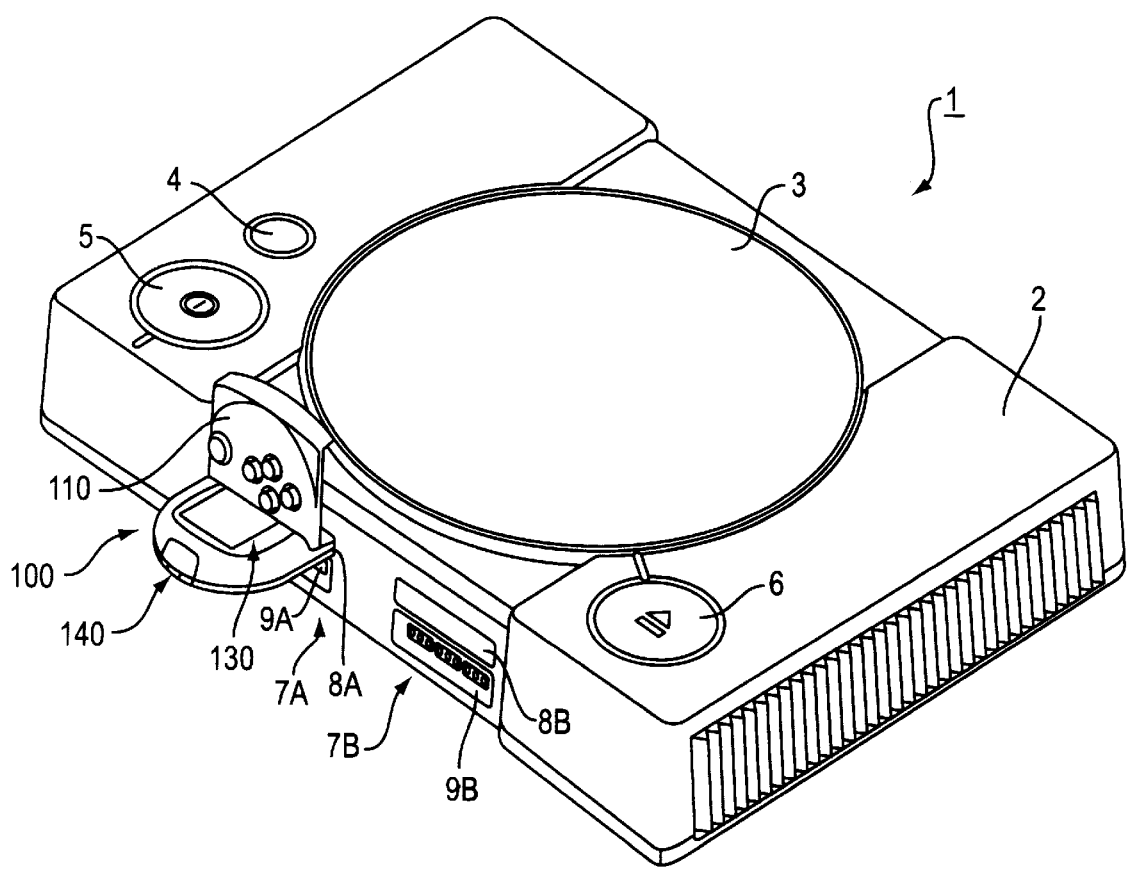
FIG. 5 is a perspective view of a video game device as a parent machine.

FIG. 5 shows the state in which portable electronic device 100, which is the aforesaid embodiment of this invention, is inserted into memory card insertion unit 8A of slot 7A on the front side of video game device 1.

Figure 6:
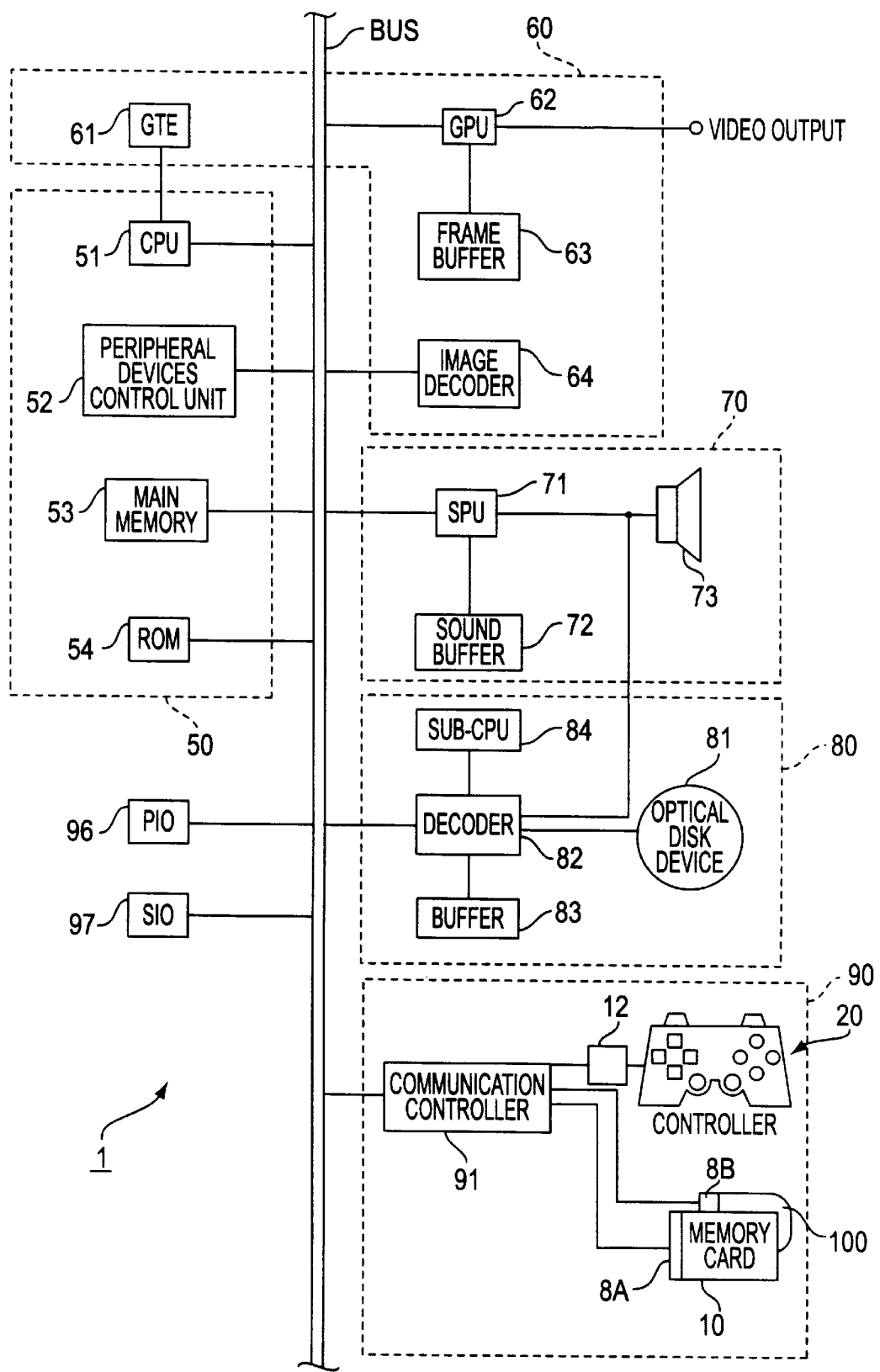
FIG. 6 is a block diagram of an example of the main part of a video game device as a parent machine.

FIG. 6 is a block diagram showing an example of the general circuit composition of the main part of the video game device 1.

The video game device 1 has a control system 50, which includes a central processing unit (CPU) 51 and its peripheral devices, a graphic system 60, which includes a graphic processing unit (GPU) 62, which draws to a frame buffer 63, a sound system 70, which includes a sound processing (SPU) 71, which generates music and sound effects, an optical disk controller 80, which controls the optical disk on which application programs are recorded, a communication controller 90, which controls the input and output of signals from controller 20, to which instructions from the user are input, and data from memory card 10, on which game settings, etc. are stored, and below-mentioned portable electronic device 100, and a bus BUS, to which the aforesaid units are connected.

Control system 50 has a CPU 51, a peripheral device controller 52, which performs interrupt control and control of direct memory access (DMA) transfers, etc., a main memory 53, which consists of random access memory (RAM), and a read-only memory (ROM) 54, in which are stored programs such as the so-called operating system, which manages main memory 53, graphic system 60, sound system 70, etc. As the term is used here, the main memory is able to execute programs in said memory.

CPU 51 is one that is able to control all of this video game device 1 by executing the operating system stored in ROM 54, and consists of, for example, a 32-bit RISC (restricted instruction set computer) CPU.

In the video game device 1, when the power is turned on, this CPU 51 of said control system 50 executes the operating system stored in ROM 54, and thereby CPU 51 corarols graphic system 60, sound system 70, etc. Also, when the operating system is executed, CPU 51 performs initialization of the entire video game device 1, including confirmation of operation, then controls optical disk controller 80 and executes the game or other application program stored on the optical disk. By execution of this game or other program, CPU 51, in accordance with input from the player, controls graphic system 60, sound system 70, etc. and controls the display of images and the generation of sound effects and music.

Graphic system 60 has geometry transfer engine (GTE) 61, which does processing such as coordinate transformations, a GPU 62, which draws in accordance with drawing instructions from CPU 51, a frame buffer 63, which stores images drawn by GPU 62; and an image decoder 64, which decodes image data compressed and encoded by orthogonal transformations such as discrete cosine transformations.

GTE 61 has, for example, a parallel computation mechanism that executes multiple operations in parallel, and is able to perform at high speed such calculations as coordinate transforms, light source calculations, and matrix or vector calculations in response to calculation requests from CPU 51. Specifically, in the case of operations in which flat shading is done, where, for example, a single triangle-shaped polygon is drawn with the same color, GTE 61 is able to perform coordinate calculations for up to about 1.5 million polygons per second, thereby making it possible, with the video game device 1, to both reduce the burden on CPU 51 and perform high-speed coordinate operations.

GPU 62 draws polygons, etc. to frame buffer 63 in accordance with drawing commands from CPU 51. This GPU 62 is able to draw up to about 360,000 polygons per second.

Frame buffer 63, which consists of a so-called dual-port RAM, is able to simultaneously carry out drawing from GPU 62 or transfers from main memory 53, and reading for the sake of display. The frame buffer 63 has a capacity of, for example, 1 megabyte and can handle a matrix consisting of 1024 pixels horizontally and 512 pixels vertically, each pixel being 16 bits. The frame buffer 63 has, besides a display region that is output as video output, a CLUT region in which is stored a color look-up table (CLUT) that is referenced when GPU 62 draws polygons, etc., and a texture region in which is stored the texture that is coordinate-transformed and mapped into polygons, etc. to be drawn by GPU 62 when drawing is done. The CLUT and texture regions dynamically change as the display region changes, etc.

GPU 62 can do, besides the flat shading, Gourod shading, in which the color within a polygon is determined by interpolation from the colors at the vertices of the polygon, and texture mapping, in which a texture stored in the texture region is put onto a polygon. If such Gourod shading or texture mapping is done, the GTE 61 can perform coordinate operations for up to about 500,000 polygons per second.

Image decoder 64 decodes the image data of still pictures or moving pictures stored in main memory 53 and stores the result into main memory 53, under control from CPU 51.

The image data generated here can be used as background for images drawn by GPU 62, by storing it into frame buffer 63 via GPU 62.

Sound system 70 has a SPU 71, which generates music and sound effects based upon instructions from CPU 51; a sound buffer 72 in which waveform data, etc. is stored by SPU 71, and a speaker 73, which outputs the music and sound effects generated by SPU 71.

SPU 71 has, for example, an ADPCM (adaptive differential PCM) decoding function that generates audio data in which 16-bit audio data is adaptively encoded by ADPCM as 4-bit difference signals, a playback function that plays back sound effects, etc. by playing back the waveform data stored in sound buffer 72; and a modulation function that modulates and plays back the waveform data stored in sound buffer 72.

With such functions, sound system 70 can be used as a so-called sampling sound source, which generates music and sound effects based on waveform data stored in sound buffer 72 under instructions from CPU 51.

Optical disk controller 80 has an optical disk device 81, which plays back the programs and data etc. recorded on an optical disk, a decoder 82, which decodes programs and data, etc. that have been recorded, for example, with an added error correction code (ECC), and a buffer 83, which speeds up the reading of data from the optical disk by temporarily storing data from optical disk device 81. A sub-CPU 84 is connected to decoder 82.

As audio data that is read by optical disk device 81 and is recorded on the optical disk, there is, besides ADPCM data, so-called PCM data, in which an analog/digital transformation is performed on audio signals.

As an example of ADPCM data, audio data in which the differences of 16-bit digital data are expressed in 4 bits and are recorded is decoded by decoder 82, then it is supplied to SPU 71, then processing such as digital/analog transformation is carried out on it by SPU 71, then it is used for driving speaker 73.

And as an example of PCM data, audio data recorded as 16-bit digital data is decoded by decoder 82 then is used for driving speaker 73.

Communication controller 90 has communication control machine 91, which controls communication with CPU 51 via bus BUS, and provided on said control machine 91 are controller connection unit 9, to which is connected controller 20, which inputs instructions from the user, and memory card insertion units 8A and 8B, who which are connected memory card 10 as an auxiliary memory device that stores game settings data, etc., and below-mentioned portable electronic device 100.

Controller 20, which is connected to controller connection unit 9, inputs instructions from the user, so it has, for example, 16 instruction keys, and it sends the state of these instruction keys to a communication control machine 91 by simultaneous communication about 60 times a second. And communication control machine 91 sends the state of the instruction keys of controller 20 to CPU 51.

Thus, instructions from the user are input into CPU 51, and CPU 51 performs processing in accordance with the instructions from the user based on the game program, etc. it is executing.

Here, it is necessary to transfer a large quantity of image data at a high speed between main memory 53, GPU 62, image decoder 64, and decoder 82, etc. when reading a program, displaying images, or drawing, etc. In the video game device 1, as stated above it is possible to do so-called DMA transfers, in which data is directly transferred between said main memory 53, GPU 62, image decoder 64, and decoder 82, etc. under control from peripheral device controller 52 without going through CPU 51. This makes it possible both to reduce the burden on CPU 51 that is caused by transferring data and to perform high-speed data transfers.

When it is necessary to store the setting data, etc. of the game that is being played, CPU 51 sends the data to be stored to communication control machine 91, and communication control machine 91 writes the data from CPU 51 into memory care 10 or portable electronic device 100 inserted in the slot of memory card insertion unit 8A or memory card insertion unit 8B.

Here a protection circuit to prevent electrical damage is built into communication control machine 91. Memory card 10 and portable electronic device 100 are separated from bus BUS and can be attached or detached while the power to the main unit of the device is turned on. Therefore even if there is no longer enough memory capacity in memory card 100 or portable electronic device 100 a new memory card can be inserted without turning off the power to the main unit of the device. Thus game data that needs to be backed up is not lost and by inserting a new memory card, the necessary data can be written onto the new memory card.

Parallel input-output interface (PIO) 96 and serial input-output interface (SIO) 97 are interfaces for connecting said memory card 100 or portable electronic device 100 and video game device 1.

Next, an embodiment of a portable electronic device of this invention will be described. In the following description, it is assumed that portable electronic device 100 of the present invention is inserted into the aforesaid parent-machine video game device 1 and is used as a child machine.

That is, portable electronic device 100 that serves as this child machine is inserted into memory card insertion unit 8 provided in slots 7A and 7B of parent-machine video game device 1, and can be used as a unique memory card that corresponds to multiple connected operation devices 20. For example, in the case where two users (game players) are playing a game, it has the previous function of recording on each of two portable electronic devices 100 the game results of each.

Also, the conductor of the connection terminal of the connector of memory card 100 or portable electronic device 100 for the power source or for the ground is shaped longer than the other terminal so that when memory card 100 or portable electronic device 100 is inserted into memory card insertion unit 8, the power source terminal or ground terminal is in a state of being electrically connected to the tip. This is in order to ensure the safety and stability of electrical operation, and one may also give the connection conductor of memory card insertion unit 8 of video game device 1 a long shape, or give both a long shape. In order to prevent misinsertion, the connectors are shaped unsymmetrically left and right.

Figure 7:
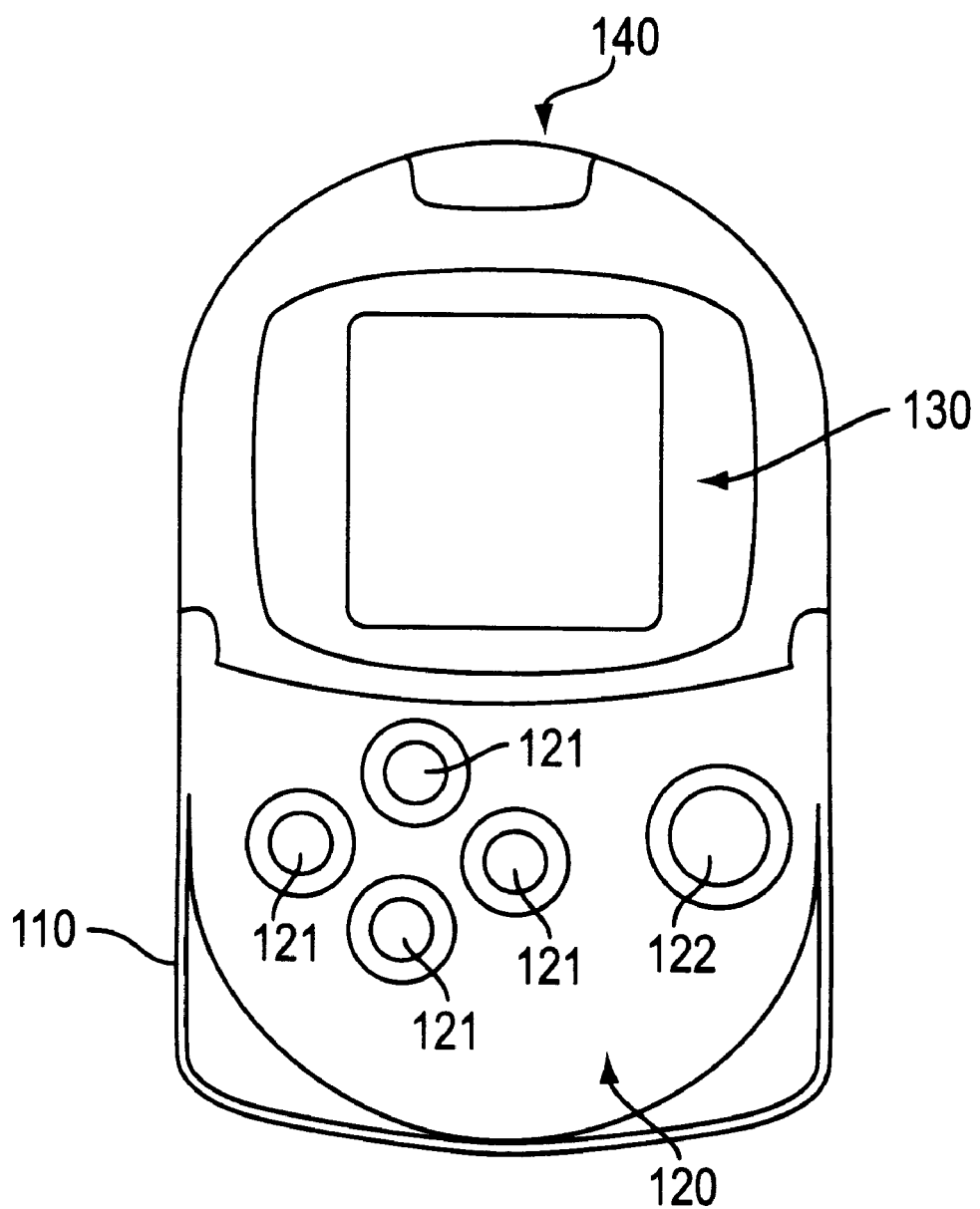
FIG. 7 is a plan view showing an embodiment of the portable electronic device of this invention.
Figure 8:
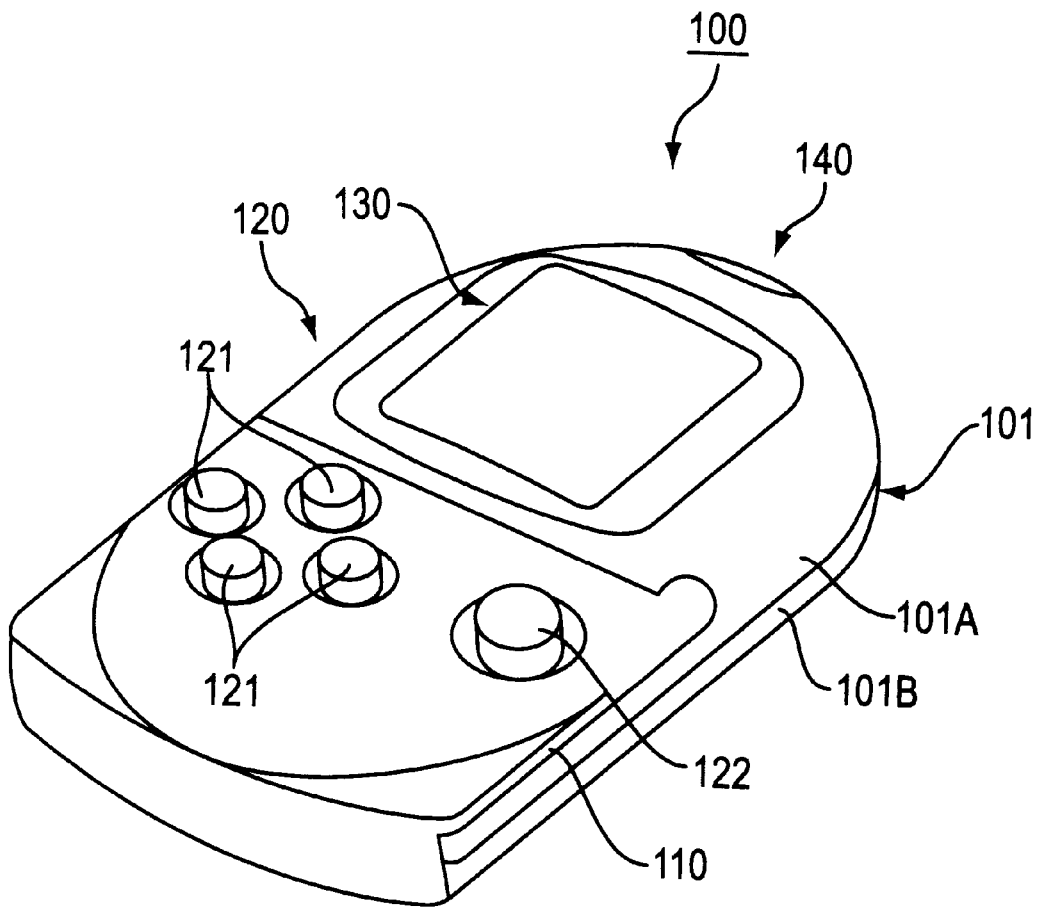
FIG. 8 is a perspective view showing an embodiment of the portable electronic device of this invention.
Figure 9:
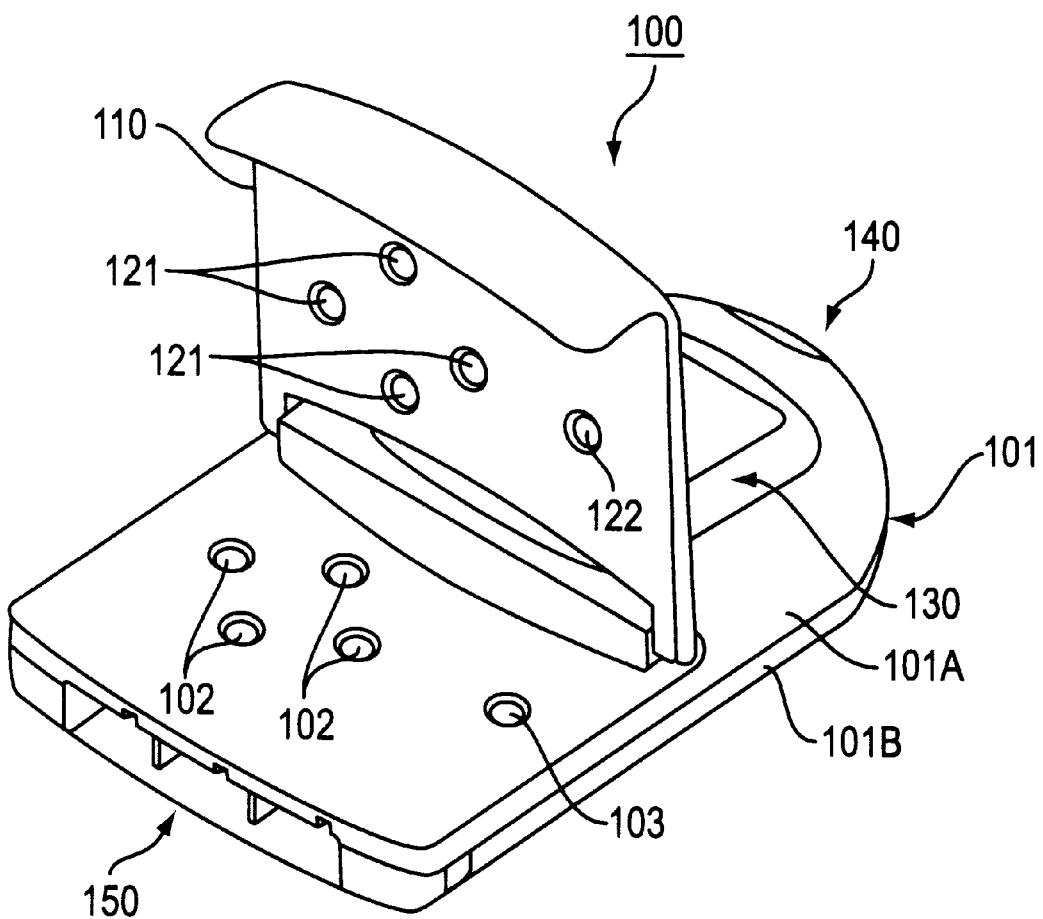
FIG. 9 is a perspective view of the portable electronic device of FIG. 8, with the cover open.

FIGS. 7 through 9 show the appearance of portable electronic device 100. FIG. 7 is a plan view of portable electronic device 100, FIG. 8 is a perspective view of the state in which a cover 110 for protecting the connector unit is closed, and FIG. 9 is a perspective view of the state in which cover 110 is open.

As shown in FIGS. 7 through 9, portable electronic device 100 of this invention is constituted to have housing 101, and is equipped with an operation unit 120 having one or more operation buttons 121, 122 for performing event input and making various selections, etc., display unit 130, which consists of a liquid crystal display (LCD), etc., and a window unit 140 for performing wireless communication by a below-mentioned wireless communication means, such as by infrared rays.

Housed inside housing 101, which consists of an upper shell 101a and lower shell 101b, is a substrate 151 on which are mounted memory elements, etc. Housing 101 has a connector unit 150, which can be inserted into slots 7A and 7B of the main unit of video game device 1, and on the side surface of one end of which is formed a rectangular window.

Window unit 140 is provided in another part of housing 101, which is formed in a roughly semicircular shape. On the upper surface part of housing 101, display unit 130 takes up about half the area of this upper surface part, and is positioned near window unit 140. On the upper surface part of housing 101, operation unit 120 take up about half the area of this upper surface part, and is provided in a part that faces window unit 140. The operation unit 120 consists of cover 110, which is supported rotatably with respect to housing 101 and has one or more operation buttons 121, 122, and switch pressing units 102, 103 provided in a position in which they are opened and closed by cover 110 on housing 101.

Operation buttons 121, 122 are arranged from the upper surface side to the lower surface side of cover 110 and pierce this cover 110. The operation buttons 121, 122 are made so that they can move in or out with respect to the upper surface part of cover 110 and are supported by said cover 110.

Switch pressing units 102, 103 are made so that they can move in or out with respect to the upper surface part of housing 101 and have pressing elements that are supported by housing 101. By being pressed from above, these pressing elements press pressure switches such as, for example, diaphragm switches that are arranged on substrate 151 in housing 101.

With cover 110 closed, the switch pressing units 102, 103 are provided in positions corresponding to the positions of operation buttons 121, 122. That is, with cover 110 closed, when operations buttons 121, 122 are pressed from above so as to sink in with respect to the upper surface part of this cover 110, these operation buttons 121, 122 press the corresponding pressure switches inside housing 101, via the pressing elements of corresponding switch pressing units 102, 103.

Figure 10:
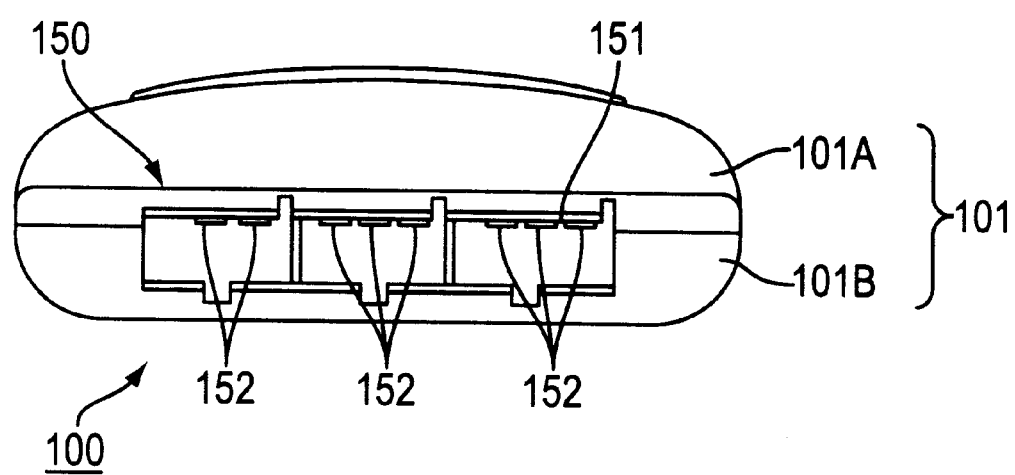
FIG. 10 is a front view of the portable electronic device of this invention.

Inside the window of connector unit 150, terminals 152 for the power source and for signals are arranged on substrate 151 facing, as shown in FIG. 10.

Figure 11:
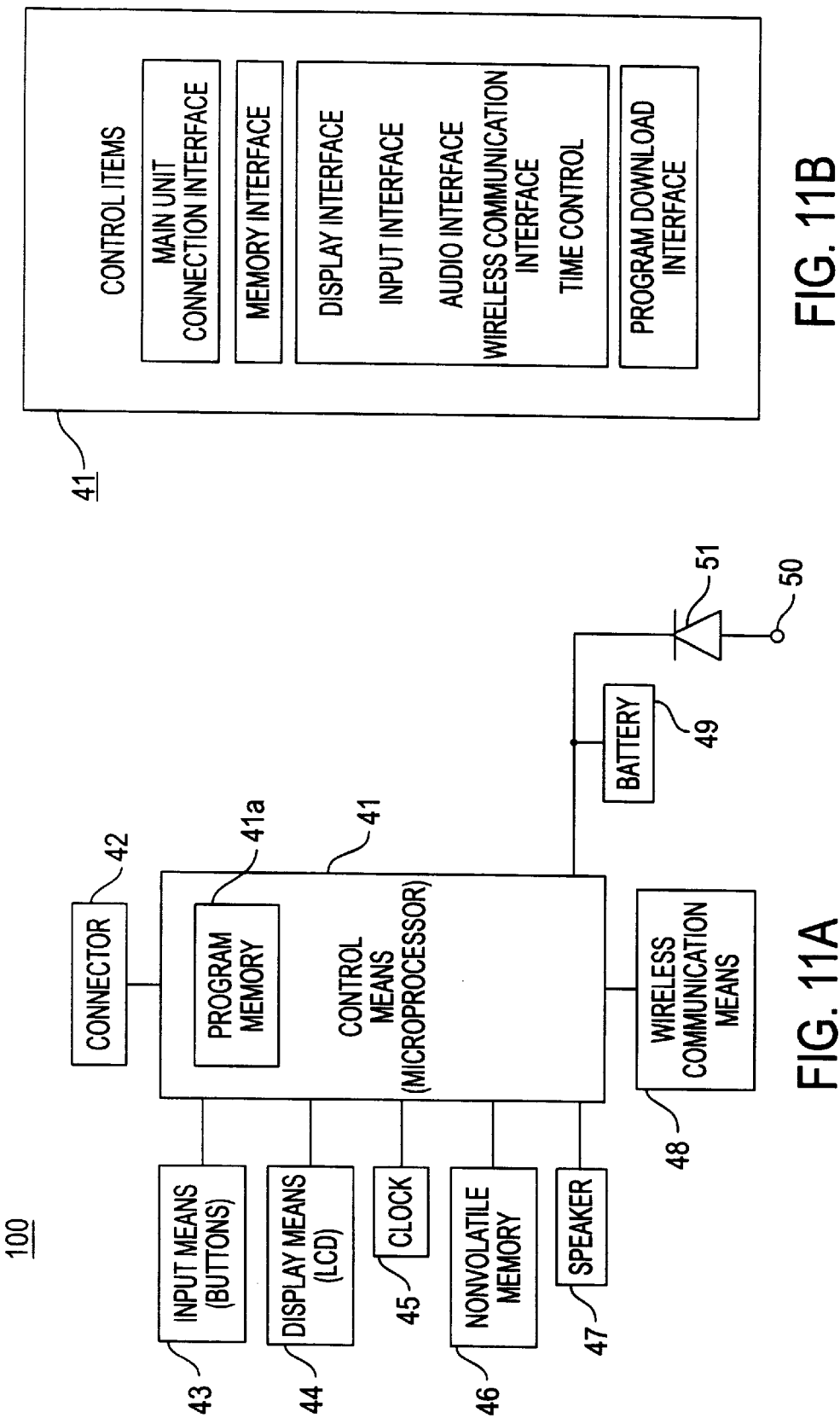
FIGS. 11A and 11B are block diagrams of an example of the composition of the main part of an embodiment of the portable electronic device of this invention.

The shape and size of connector unit 150 is in common with ordinary memory card 10 used in video game device 1. FIG. 11A is a block diagram showing an example of the composition of the main part of said portable electronic device.

Like the ordinary memory card 10, portable electronic device 100 has a control unit 41 for controlling its operation, connector 42 for connecting it to the slot of an information device, etc., and nonvolatile memory 46, which is an element for storing data Control unit 41 is constituted using, for example, microprocessor (labeled as such in the diagram) and has built into it program memory unit 41a, which is a program storage means.

Used as nonvolatile memory 46 is a semiconductor memory element (for example, 128K byte) whose recorded state remains even if the power is turned off, such as a flash memory. Because the portable electronic device 100 of this invention is constituted so as to have a battery 49 as described below, one may use as nonvolatile memory 46 a static random access memory (SRAM), which allows data to be input and output at high speed.

In addition to the above described configuration, portable electronic device 100 is different in that it has an operation (event) input unit 43 with operation buttons, etc. for operating stored programs, display means 44, which is a display means that displays various information in accordance with said program, such as, for example, a liquid crystal display (LCD) with 32-by-32-dot monochrome display, wireless communication means that sends and receives data with other memory cards, etc. by infrared rays, etc., and battery 49, which supplies power to all the above components.

The small battery 49 is built into it as a power supply means. Thus it can operate independently even when removed from slots 7A and 7B of parent-machine video game device 1. Also, a rechargeable secondary battery may be used as battery 49. The configuration is such that with child-machine portable electronic device 100 inserted into slot 7A or 7B of parent-machine video game device 1, power is supplied from parent-machine video game device 1. The power source terminal 50 is connected to the connection terminal of battery 49 via diode 51 to prevent a reverse current, and when inserted and connected in a slot of the parent machine, such as above video game device 1, power is supplied from the parent machine to the child machine, and if a secondary battery is being used, the secondary battery is also charged.

This portable electronic device 100 may also have a clock 45 and a speaker 47, which is a sound generation means that generates sound in accordance with said program. Each of the above components is connected to control means 41 and operates under the control of control means 41.

FIG. 11B shows the control elements of control unit 41. With an ordinary memory card 10, control unit 41 has only a main unit connection interface 501 to information devices and a memory interface 502 for inputting and outputting data to the memory. However, with portable electronic device 100 of this invention, control unit 41 has, in addition to the above interfaces, a display interface 503, an operation input interface 504, an audio interface 505, a wireless communication interface 506, a time control 507, and a program download interface 508.

In this way, portable electronic device 100 can maintain compatibility with previous functions, because its control unit (microprocessor) 41 has been given an interface for managing functions added by his embodiment, independently of the previous functions of a main unit (parent machine) connection interface and management of the nonvolatile memory.

Also, portable electronic device 100, having been constituted to have the input unit 43 such as button switches for operating the program to be executed and display means 44 using a liquid crystal display (LCD), etc., can be applied as a portable game device when a game application is run.

Because the portable electronic device 100 also has the function of storing in program memory unit 41a in microprocessor 41 a program downloaded from the main unit of video game device 1, the application programs or various drivers to be run on portable electronic device 100 can easily be modified.

As described above, portable electronic device 100 of this invention can control operations independently of video game device 1. Therefore the data due to the application that is stored in programrn memory unit 41a, which is the program storage unit, on the portable electronic device 100 side can be prepared independently of the application software on the side of the video game device 1. And coordination operation (linkage) between portable electronic device 100 and video game device 1 can be done by exchanging this data with video game device 1.

Moreover, by equipping portable electronic device 100 with a clock 45, time data can be shared with video game device 1. That is, they can not only synchronize their time data with each other but also share data for controlling in real time the progress of a game that each is executing independently.

Figure 12:
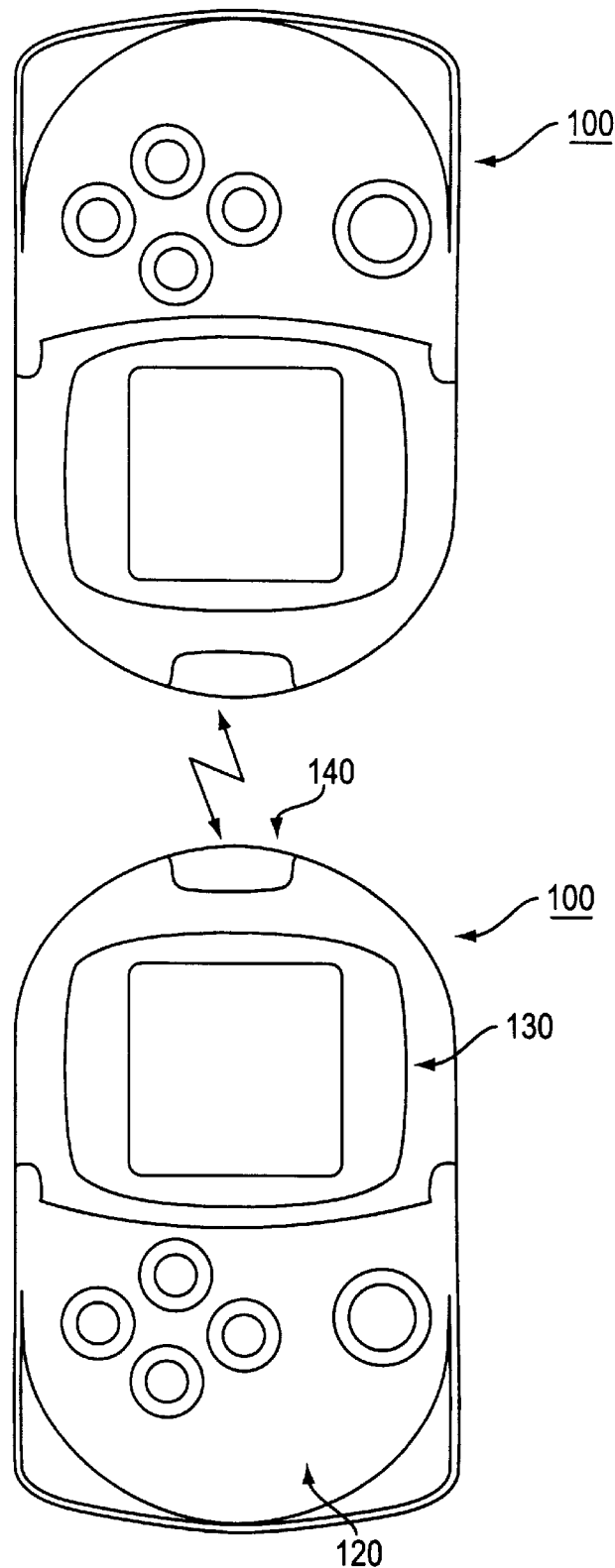
FIG. 12 is a diagram for explaining the wireless communication function of the portable electronic device of this invention.

FIG. 12 shows a way of how wireless communication is done between two portable electronic devices 100 of the invention By sending and receiving data through window unit 140, which is a wireless communication window for doing wireless communication by infrared rays, etc. in wireless communication device 48, portable electronic devices 100 can thus exchange internal data between multiple memory cards. Said internal data includes, for example, data stored in the memory means built into a memory card that is transferred from the information device side of a video game device, etc.

In the embodiment, portable electronic device 100 has be described as being used as an auxiliary memory means of a video game device, but its applications are not limited to a video game device; it may of course also be applied to various information retrieval, etc.

As described above, portable electronic device 100 may share with the main unit of video game device 1 game data that is generated by microprocessor 41, which is a control unit, time data obtained by clock 45 in a memory card, or data generated by another memory card that is obtained via wireless communication device 48.

Figure 13:
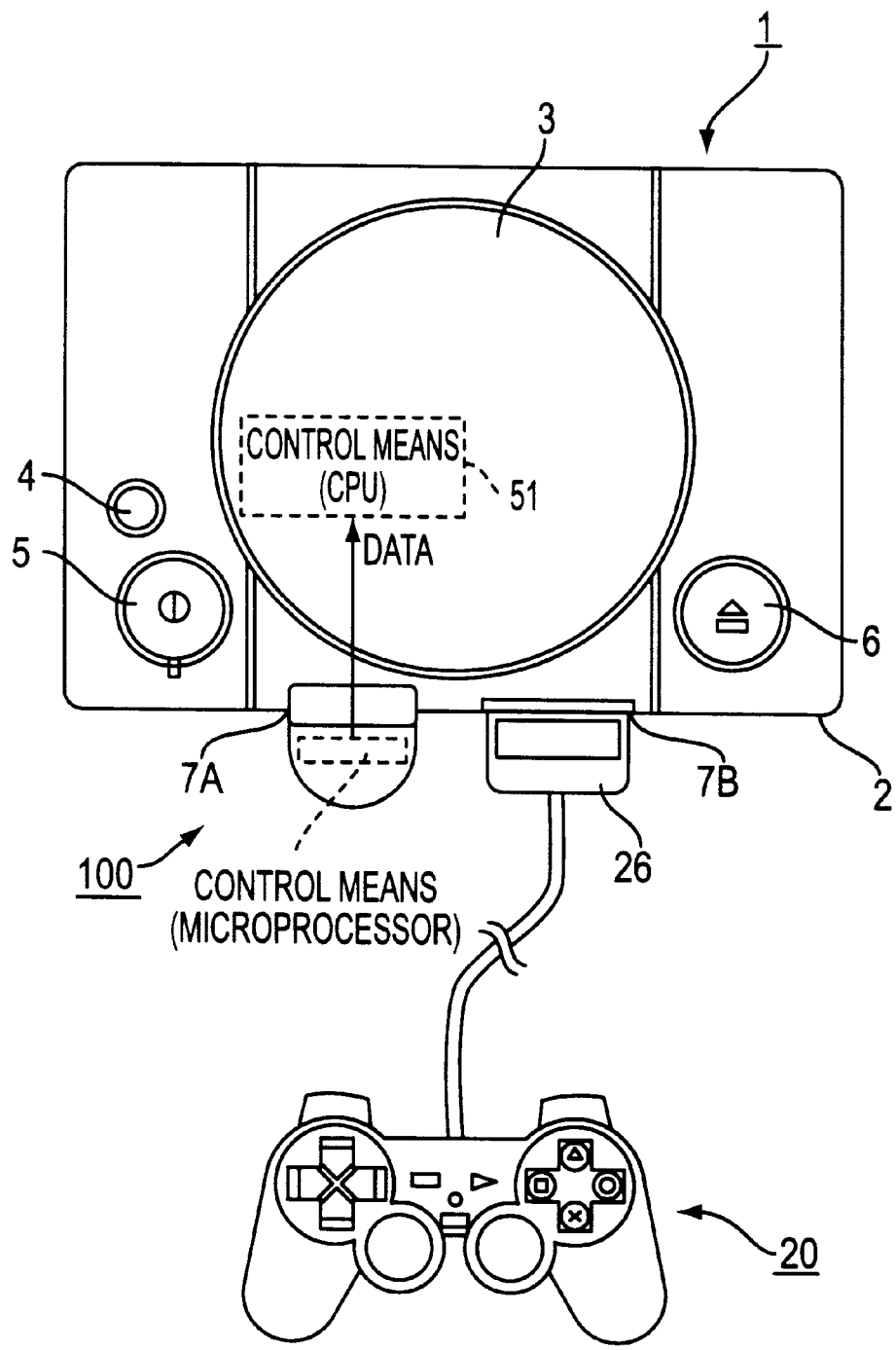
FIG. 13 is a diagram for explaining the coordination operation between a child machine of the portable electronic device of this invention and the main unit of a video game device which is the parent machine.

FIG. 13 shows a way of how coordination operation is done between video game device 1, which serves as the parent machine, and portable electronic device 100 of the invention, which serves as the child machine.

The case when a optical disk (CD-ROM), which is a recording medium on which an application software programs are recorded, is mounted on video game device 1, which is the parent machine, and a program read from it is downloaded to a portable electronic device 100, which is the child machine and is inserted into slot 7A or 7B of the main unit of video game device 1 will be now described.

Figure 14:
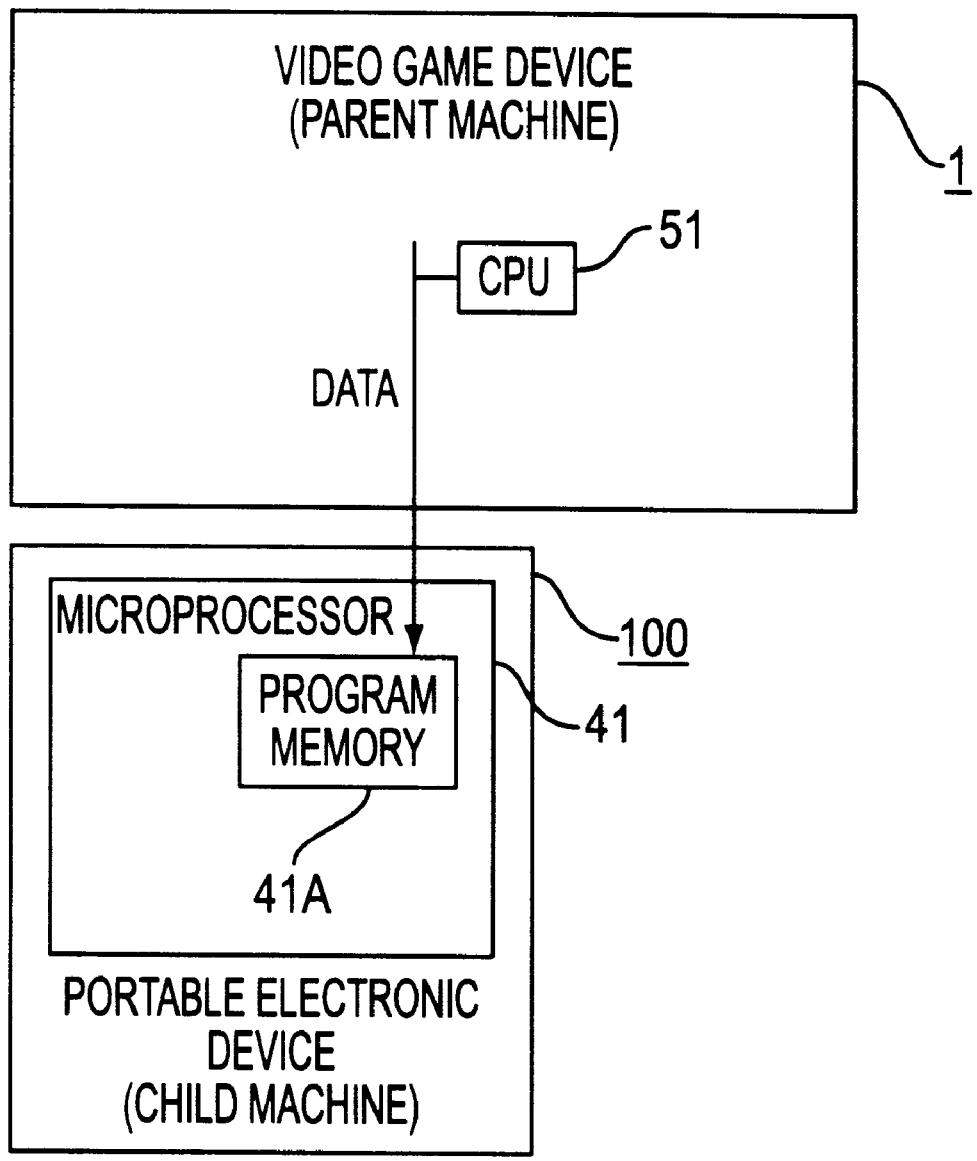
FIG. 14 is a diagram showing the flow of program data downloaded from the video game device main unit (parent machine) to the portable electronic device (child machine)

FIG. 14 shows the flow of data in the case when a video game application program supplied from an optical disk (CD-ROM), etc. mounted on disk mounting unit 3 of parent-machine video game device 1 is directly transferred (downloaded) via CPU 51, which is the control means of video game device 1, of the program memory unit 41a, which is the program storage means, within microprocessor 41, which is the control means of portable electronic device 100, which is the child machine.

Figure 15:
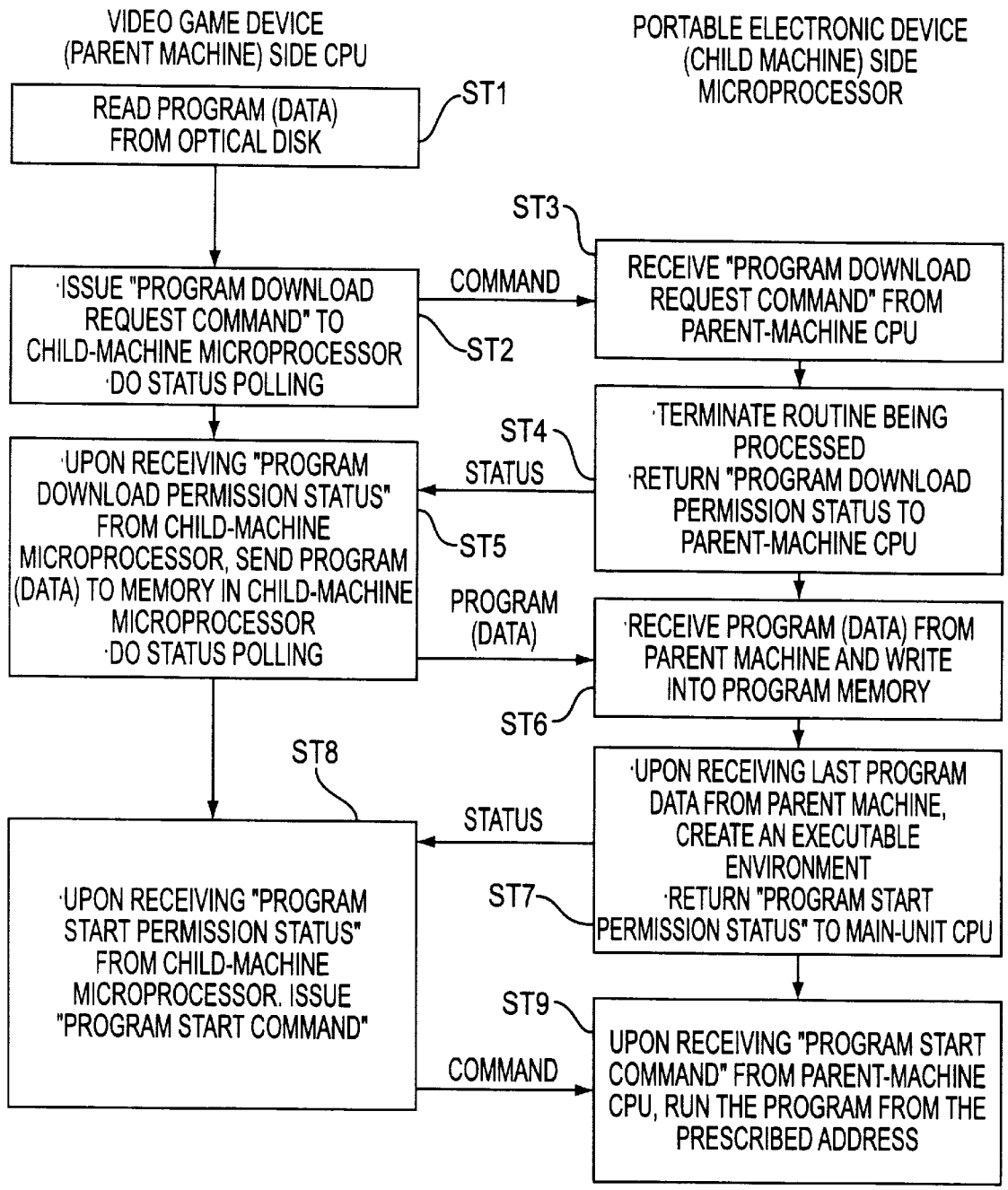
FIG. 15 is a flowchart showing the procedure of downloading of the flow of program data of FIG. 14.

FIG. 15 shows the procedure for the downloading procedure of FIG. 14.

In step ST1, first, a video game application program that is to run on the microprocessor within portable electronic device 100 as the child machine is read as data from a CD-ROM that is mounted on disk mounting unit 3 of video game device 1 as the parent machine (hereafter called simply the parent machine). As stated above, this application program is separate from those that generally run on parent-machine video game device 1.

Next, in step ST2, CPU 9, which is the control unit of the parent machine, issues a "program download command" to microprocessor 41, which is the control means of child-machine portable electronic device 100. Then CPU 9 does polling to receive the "program download permission status" from microprocessor 41. Here "polling" means a method that makes inquiries about whether there are any service requests and performs services.

In step ST3, microprocessor 41 on the child-machine portable electronic device 100 side receives a "program download request command" from parent-machine CPU 9.

Then, in step ST4, when microprocessor 41 on the child-machine side gets into a state of being able to execute program download, having terminated the routine presently being processed, it returns the "program download permission status" to parent-machine CPU 9. Next, in step ST5, when parent-machine CPU 9 receives the "program download permission status" from microprocessor 41 on the child-machine side, the program read in step ST1 from the CD-ROM, etc. is transferred (downloaded) and written into program memory unit 41a, which is the program storage means of portable electronic device 100. Also, CPU 9 does polling for receiving the "program start permission status" from microprocessor 41.

At this time, the address of program memory unit 41a the downloaded data is written to is managed by microprocessor 41. Also, although above description takes as an example the case where the program downloaded from the parent machine is stored in program memory unit 41a within microprocessor 41, it may be stored into an SRAM or other memory element that is capable of high-speed data input and output.

In step ST6, microprocessor 41 of the memory card receives as data the program transferred from the parent machine and writes it into program memory unit 41a. At this time, it appears from CPU 9 of the parent machine that the program data is being written directly into program memory unit 41 of child-machine portable electronic device 100. And as stated above, the address of program memory unit 41a is managed by microprocessor 41.

In step ST7, microprocessor 41 of child-machine portable electronic device 100 returns to CPU 51 of the main unit the "program start permission status" when it creates an environment in which the final program data can be received from the parent machine and executed.

In step ST8, CPU 9 of the parent machine receives the "program start permission status" from microprocessor 41 of portable electronic device 100 and issues a "program start command".

When microprocessor 41 of portable electronic device 100 receives a "program start command" from CPU 9 of the parent machine, it causes the program to run beginning from a predetermined address.

By the above procedure, an application program is directly transferred (downloaded) from parent-machine video game device 1 into program memory unit 41a in microprocessor 41 of child-machine portable electronic device 100, which is inserted into the parent machine.

And as stated above, the means that supplies the application program is not limited to a recording medium such as an optical disk, the supplying may also be done via a communication circuit. In that case, only step ST1 in the above procedure will be different.

The above download procedure describes the download procedure in the case where an application program is directly downloaded from parent-machine video game device 1 into program memory unit 41a in microprocessor 41, which is the control means of child-machine portable electronic device 100, which is inserted into the parent machine.

Figure 16:
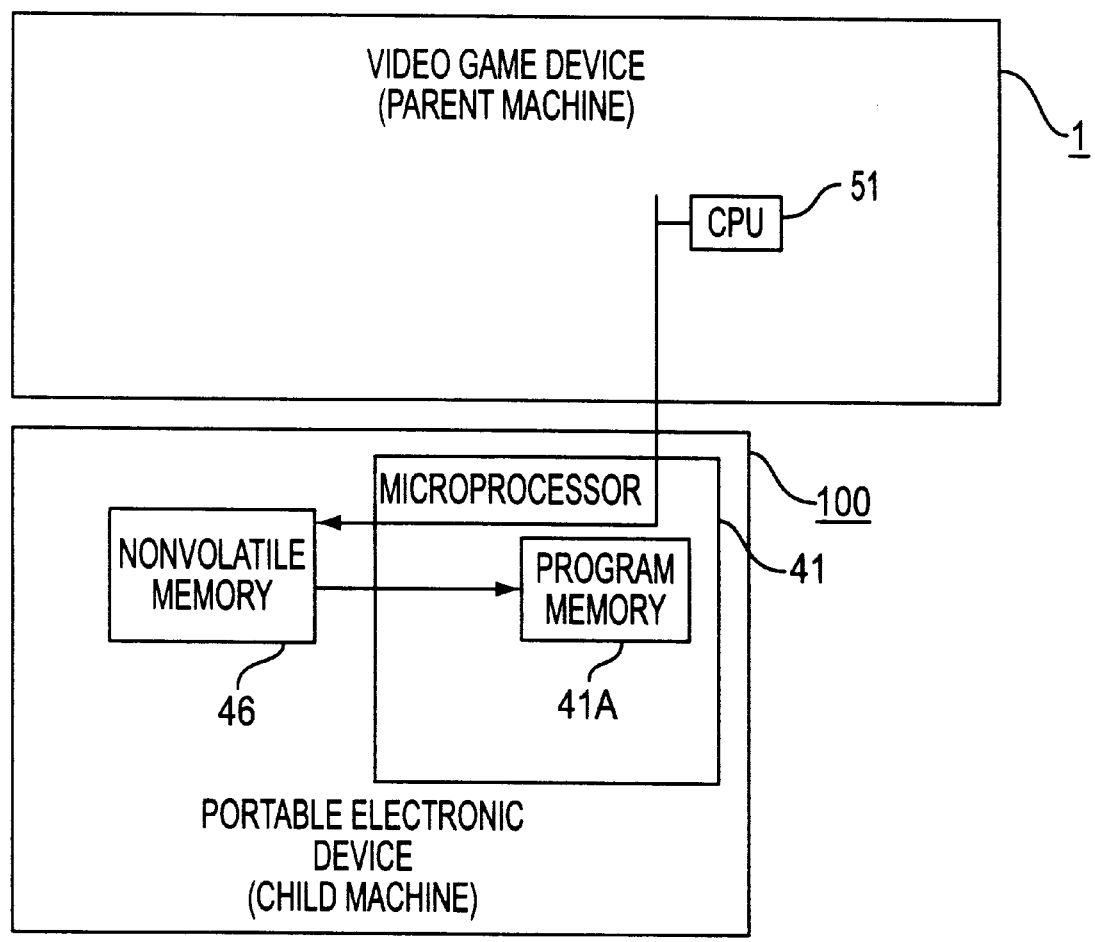
FIG. 16 is another diagram showing the flow of program data downloaded from the video game device main unit (parent machine) to the portable electronic device (child machine).

By contrast, there is also the case where CPU 9 of the parent machine downloads the data of the application program into nonvolatile memory 46 in child-machine portable electronic device 100, then the data is copied to program memory unit 41a in microprocessor 41 and is executed FIG. 16 shows the flow of data in such a case. That is, a video game application program supplied from an optical disk, etc. mounted in disk mounting unit 3 of parent-machine video game device 1 is transferred (downloaded) to nonvolatile memory 46 in child-machine portable electronic device 100 via CPU51, which is the control means of video game device 1, then it is copied into program memory unit 41a in microprocessor 41, which is a control unit, and is executed.

Figure 17:
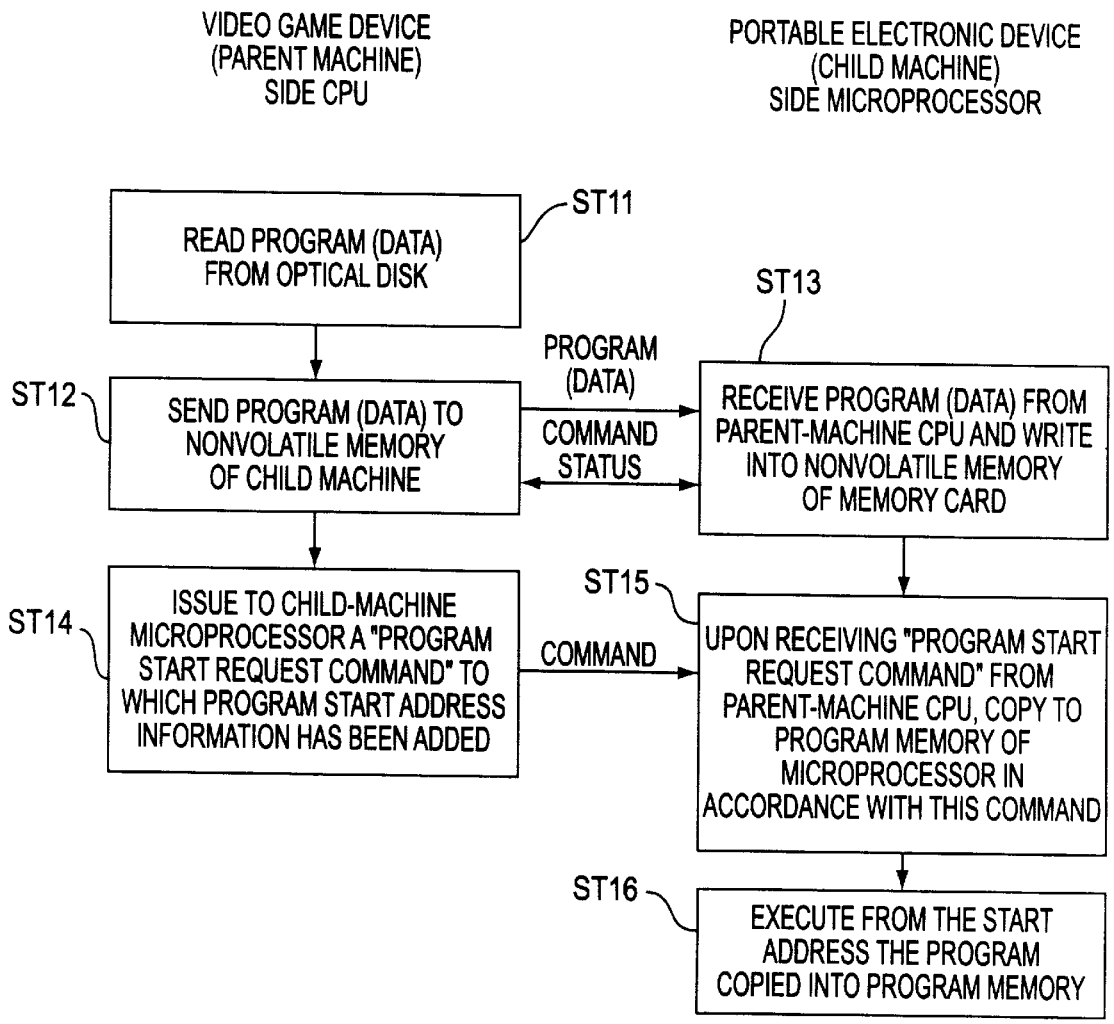
FIG. 17 is a flowchart showing the procedure of downloading of the flow of program data of FIG. 16.

FIG. 17 shows the procedure for the above downloading.

In step ST11, first, a video game application program that is to run on the microprocessor within child-machine portable electronic device 100 is read as data from a CD-ROM that is mounted on disk mounting unit 3 of parent-machine video game device 1.

Then, in step ST12, CPU 9, which is the control means of the parent machine, transfers (downloads) the program data read from the CD-ROM to nonvolatile memory 46 of child-machine portable electronic device 100. This procedure is the same as in the case of backing up data in a conventional video game device.

Next, in step ST13, microprocessor 41, which is the control means of portable electronic device 100, receives as data the application program that was transferred from CPU 9 of the patent machine by the same procedure as in a conventional data backup and writes it into nonvolatile memory 46.

Next, in step ST14, when microprocessor 41 of portable electronic device 100 receives a "program start request command" from CPU 9 of the parent machine, it copies data of the given size, beginning with the address given by that command of nonvolatile memory 46, to program memory unit 41a in microprocessor 41.

And microprocessor 41 of portable electronic device 100 executes from the start address the program that was copied to program memory unit 41a.

By the above procedure, an application software program is transferred (downloaded) as data from parent-machine video game device 1 via nonvolatile memory 46 to program memory unit 41a in microprocessor 41 of child-machine portable electronic device 100, which is inserted into the parent machine.

The application program that is downloaded from patent-machine video game device 1 to child-machine portable electronic device 100 is generally separate from what runs on parent-machine video game device 1. Of course, said downloaded application program may also run on both video game device 1 and portable electronic device 100. But in that case, the restriction arises that the CPU on the video game device 1 side and the microprocessor on the portable electronic device 100 side must be the same processor.

Next, will be described the coordination operation that is carried out while the application software program that is downloaded from parent-machine video game device 1 by the above procedure is independently executed on child-machine portable electronic device 100 and the execution results are again exchanged with video game device 1.

Here, data on the persons that appear in a so-called role-playing game to be run on parent-machine video game device 1 along with their character attributes is downloaded to child-machine portable electronic device 100. Said attribute data also expresses degree of growth, personality, etc.

By training the personalities and characters that appear in a program executed by microprocessor 41 in child-machine portable electronic device 100, their attributes are modified independently of the program that is executed on the main unit of parent-machine video game device 1.

Such a portable electronic device 100, which is an embodiment of the invention, is constituted so as to operate independently, and being small, it is convenient for carrying around. Thus a user (game player) can carry around and raise at any time the personalities and characters that appear in a program executed on this portable electronic device 100. The user can also transfer (download) the attributes of the appearing personalities and characters trained by hin from portable electronic device 100 to the main unit of video game device 1. In this case, appearing personalities and characters whose attributes have changed can be brought into and run on a program that is executed on parent-machine video game device 1.

As described above, a video game can be constituted in which coordination operations can be done on both parent-machine video game device 1 and child-machine portable electronic device 100 by sharing and modifying together the attribute data of the appearing personalities, etc.

Above, there have been described use as coordination operation of child-machine portable electronic device 100 while exchanging with video game device 1, and use as a video game device on which application software downloaded from parent-machine video game device 1 is executed independently on child-machine portable electronic device 100.

Here a mode in which child-machine portable electronic device 100 is used as an electronic device other than a video game device has been newly proposed.

Generally, game software is accumulated on a CD-ROM or other optical disk and is sold separately from the parent machine, child machine, and other hardware. The inventors of this invention have focused on additionally providing, in the empty memory region of a CD-ROM, etc. on which specified game software is accumulated, highly convenient programs such as calculator programs and remote control programs.

Here there will be described an example in which calculator program data is distributed on a CD-ROM and is used after this program is transferred from the parent machine to the child machine.

A CD-ROM, etc. on which is accumulated calculator program data, menu screen data, remote control program data, etc. is distributed, the parent machine reads it, and the user, by a screen, transfers the calculator program data to the child machine. The child machine saves this calculator program.

Figure 18:
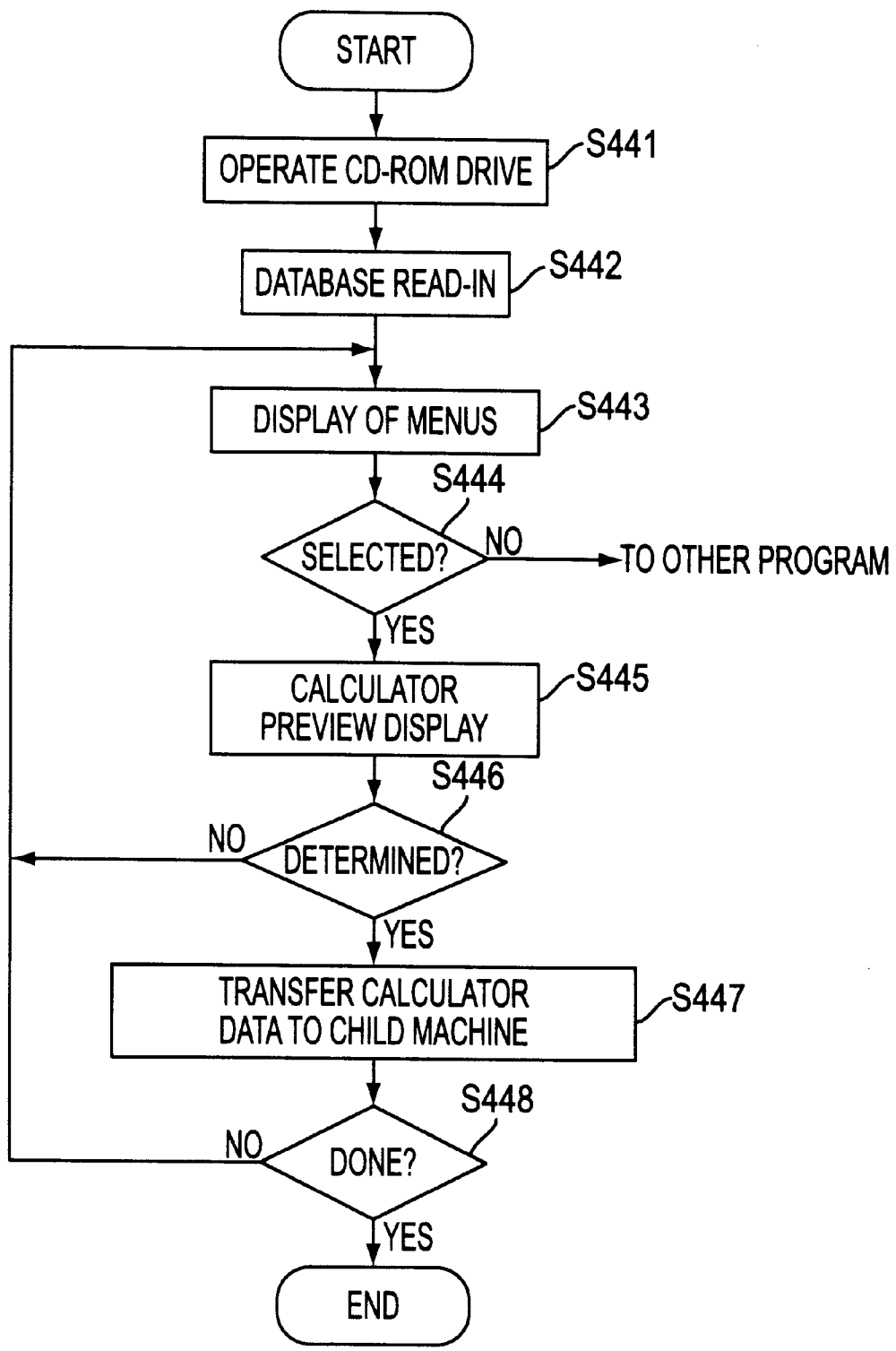
FIG. 18 is a flowchart showing the processing procedure on the parent machine side when the calculator program is downloaded.

First, the series of processing on the parent machine side, referring to the flowchart shown in FIG. 18 will be described.

A database including menu data, calculator program data, remote control data, etc. is accumulated in any empty region of CD-ROM 300 on which game software is accumulated. The CD-ROM is put onto the parent machine and driven in initial step S441, the database is read in step S442, and the menu data is displayed as a menu screen on a television receiver in step S443.

Figure 19:
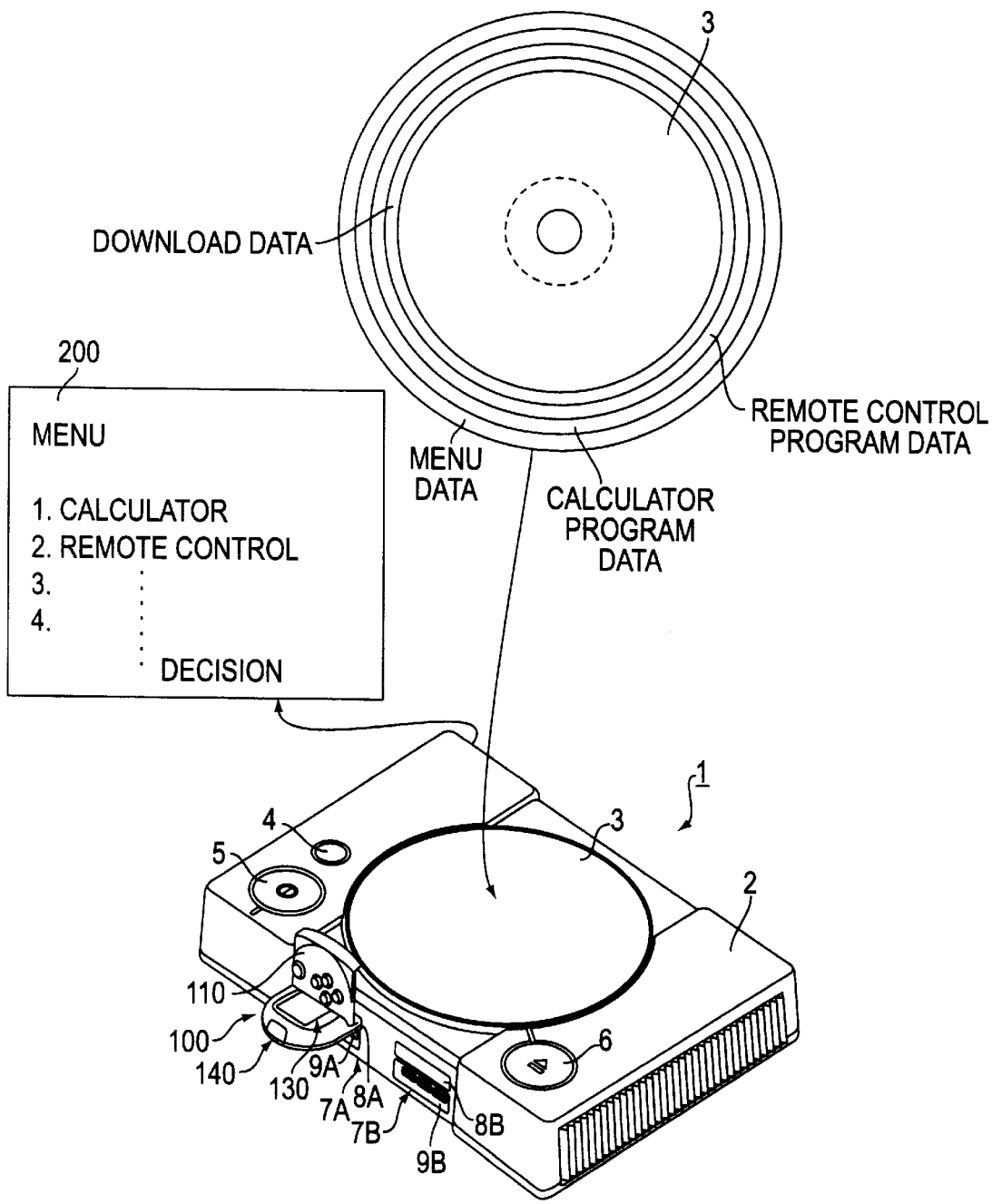
FIG. 19 is a diagram that explains the state when the calculator program is downloaded.

FIG. 19 is a diagram that explains the situation of this processing on the parent machine side. Download data, menu data, calculator program data, remote control program data, etc. is stored on CD-ROM 300, which is put onto parent machine 1. When this is driven by parent machine 1 and the database is read in, menu screen 200 is displayed on the television receiver that is connected to the parent machine.

Then one proceeds to the following step S444.

In step S444, a branch is made depending on whether the calculator displayed in step S443 is selected. That is, the user, while viewing menu screen 200 on the television receiver, moves the cursor onto "1. Calculator" by operating the four up-down-left-right buttons of first operation unit 21 of operation device 20 (see FIG. 3). Besides identification by the cursor, by operating operation unit 21 of operation device 20 one can alter the display of the relevant program so that it is displayed in reverse or in a different color from other programs.

In this way, if the calculator is chosen, one proceeds to step S445 as "YES", and if the calculator is not chosen, one moves to the relevant program of the selected menu as "NO".

In step S445, one preview-displays the appearance of the calculator in order to achieve a visual effect. Then one proceeds to step S446.

In step S446, a branch is made depending on whether the calculator selection has been determined. If the calculator selection has been determined, one proceeds to step S447 as "YES", and if it has not been determined, one proceeds to step S443 as "NO". This determination is made by operating second operation unit 22 of operation device 20.

Figure 20:
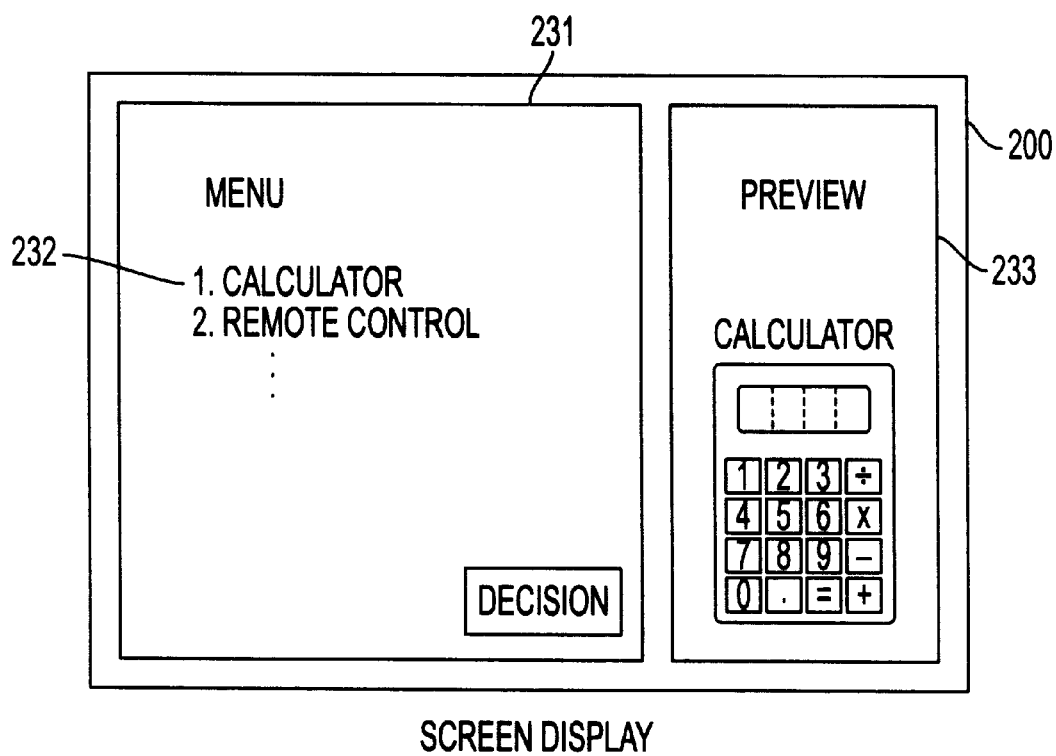
FIG. 20 is a diagram showing the menu screen when the calculator program is downloaded.

FIG. 20 shows the state of such a calculator program determination. Here, a roughly rectangular program display window 231 is opened on the left side of display screen 200, and a roughly rectangular preview window 233 is opened on the right side of display screen 200.

The programs accumulated on CD-ROM 3 are displayed on program display window 231. The programs displayed in program display window 231 can, after selection, be given a prescribed operation, such as, for example, recording. The selected program is set to reverse display 232.

Displayed in preview window 233 is a preview screen with the appearance of a calculator in order to prompt the user to select the calculator when the calculator program is selected.

Returning to FIG. 18, in step S447, the selected calculator program data is transferred to the child machine, and one proceeds to the following step S448.

In step S448, a branch is made depending on whether this series of steps shall be terminated. If "terminate" is selected, this series of steps is terminated as "YES", and if "terminate" is not selected, one returns to step S443 as "NO".

Figure 21:
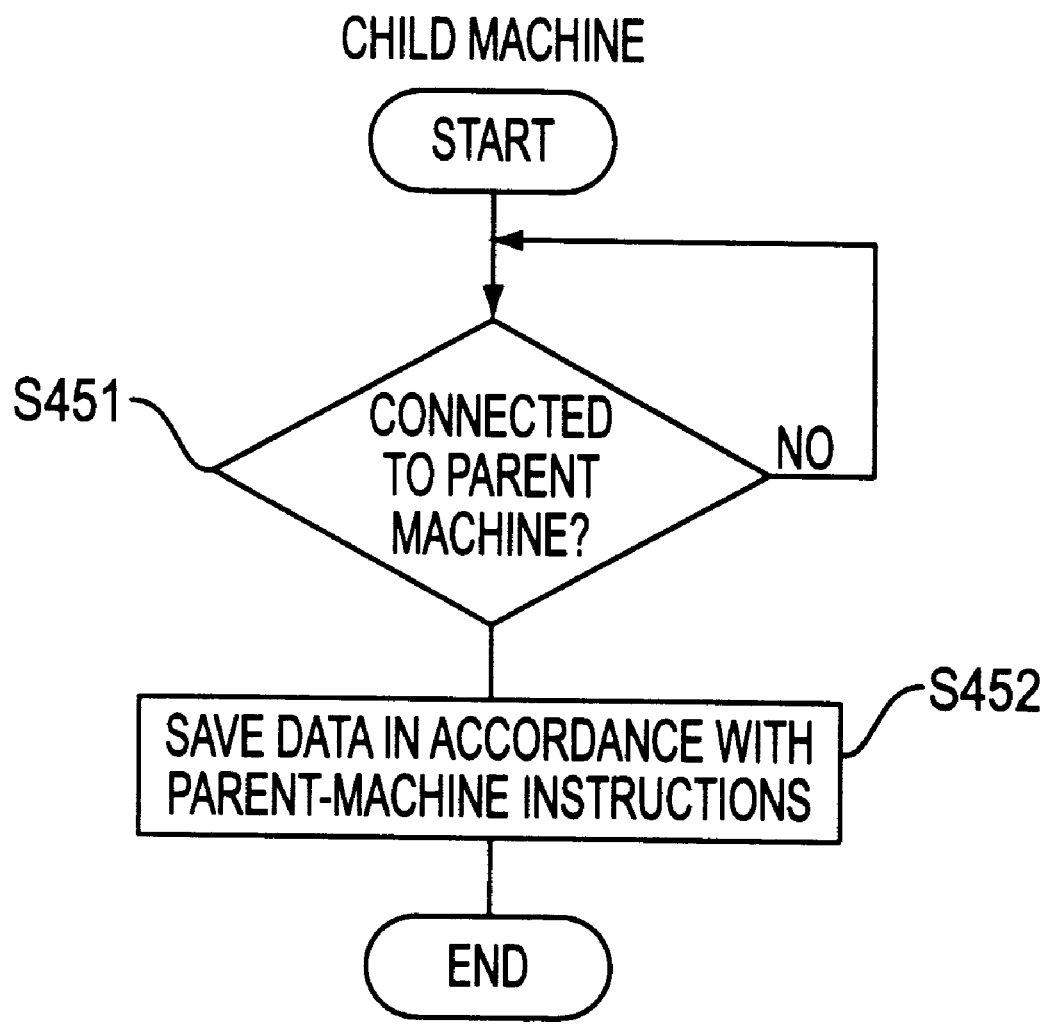
FIG. 21 is a flowchart showing the processing procedure on the child machine side when the calculator program is downloaded.

Continuing, the series of steps for processing on the child-machine side is described with reference to the flowchart shown in FIG. 21.

In first step S451, a branch is made depending on whether it is connected to the parent machine. That is, if it is connected to the parent machine, one proceeds to step S452 as "YES", and if it is not connected to the parent machine, one returns to step S451 again as "NO".

In step S452, the calculator program data is saved to the parent machine according to instructions. Then this series of steps is terminated.

As stated above, the calculator program data is distributed on a CD-ROM the parent machine reads it in, and the user selects the calculator on the screen and transfers its data to the child machine.

Next, there will be described the calculator program that is transferred to the child machine and how it is used.

Before describing the calculator that makes use of this child machine, we describe in hardware terms the functions of calculators that are generally available commercially. This is because the calculator that makes use of this child machine can, by software with the program downloaded from the CD-ROM via the parent machine, be given the same functions as such a commercially available calculator.

Various types of general calculators are available commercially, with some differences from one manufacturer to another in the key display and key operation, but the calculator described in this embodiment is one of the most basic kind.

The keys the calculator has as number-specifying keys are the ten digit keys from "0" to "9", and the decimal point ".". That is, number specifying means pressing the numerical values necessary for a calculation. Also, as function keys (also known as operation keys), there are the keys "+", "−", "×", "/", which are needed for addition, subtraction, multiplication, division, and the "=" key.

On a calculator, the sequence of specifying a certain numerical value, then pressing an operation key, then again specifying a certain numerical value is called an operation. Next, when the equal key "=" is pressed, the calculation result is displayed. Usually in calculator operations, a calculation method is adopted that is executed by an operation key before number specification. For example, the operation "2+3" is taken as two sets, "+2" and "+3", and the "+" before the "2" is taken to have been omitted.

Figure 22:
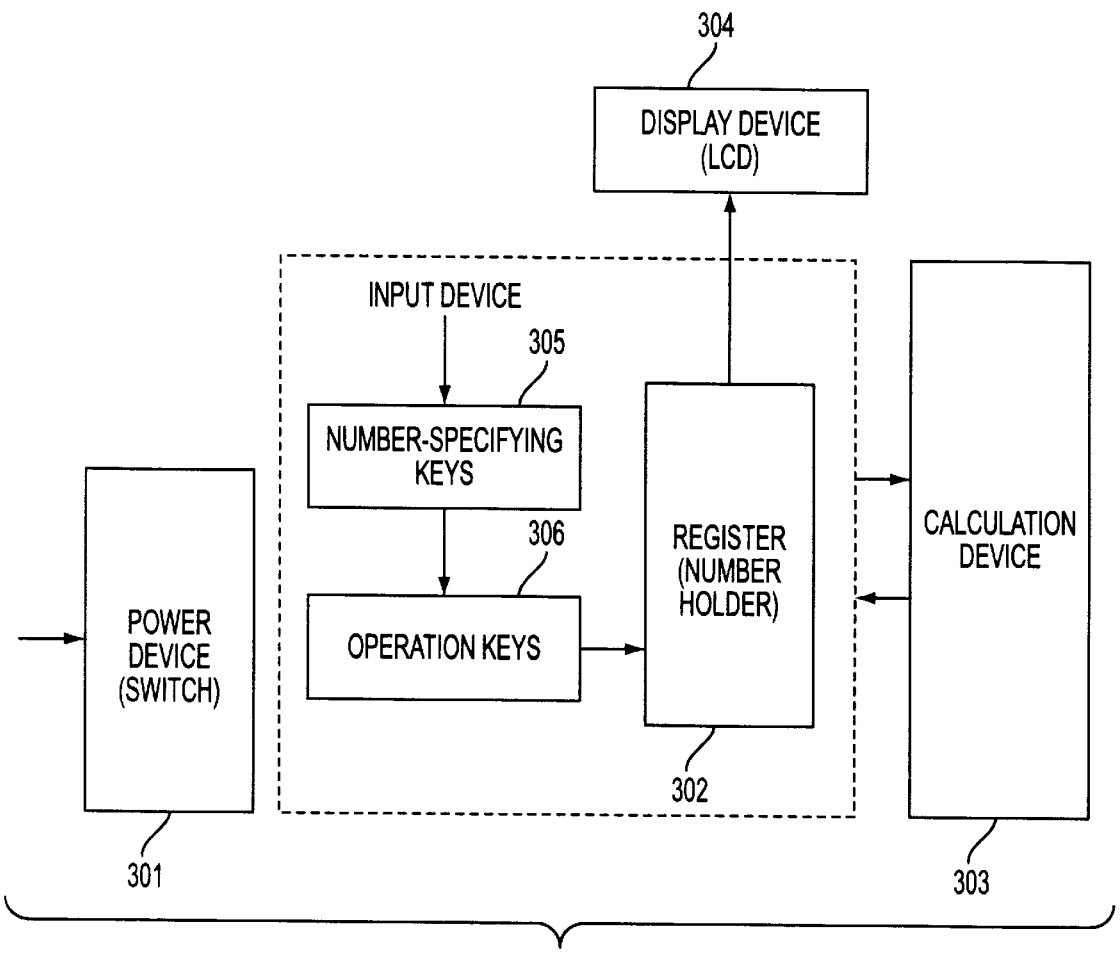
FIG. 22 is a flowchart showing the processing procedure on the parent machine side when the calculator program is downloaded.

As shown in FIG. 22, a general calculator by which such operations are executed basically has a power source device 301, a register (number holder) 302 in which a number specification is temporarily stored, an operation device 303, and a display device 304 consisting of LCDs that display digits. Input of number-specifying keys 305 and operation keys 306 is done by an operation in which a human presses them with his fingers.

Register 302 temporarily stores numerical values such as the input number to be operated on, the operand, and the calculation result Operation device 303 consists of calculation circuitry and executes the four basic operations of addition, subtraction, multiplication, and division based on the operation of the operation keys 306, using the number to be operated on and the operand. This calculation result is displayed in display device 304 via register 302.

In the addition operation that corresponds to the operation key "+", one specifies the addend in the accumulator and adds to it the numerical value in the addition register. The result remains in the accumulator. The addition is done by a full adder, and a fill adder consists of two half adders.

In the subtraction operation that corresponds to operation key "−", there are a method that adds the complement and a method that uses a subtraction register. The multiplication operation that corresponds to operation key "×" is executed by repeatedly multiplying one digit at a time, shifting, and adding. The division operation that corresponds to operation key "/" involves repeated addition, subtraction, shifting and decision steps.

How to put the four basic finctions that a general calculator has into the form of a program is itself already well known.

As explained with reference to FIGS. 11A and 11B, the child machine consists of a microprocessor and has built into it control unit 41, which has program memory 41a built into it, and nonvolatile memory 46. Built into program memory 41a is an operating system that controls the operations of the child machine.

With the calculator program that is downloaded from the parent machine into nonvolatile memory 46, the aforesaid four basic operations are executed by this microprocessor under the control of the operating system. One feature of this calculator program is that the graphics for the digits from 0 to 9 can be displayed not just in the normal way as black against a white background but also in reverse, as white against a black background.

Figure 23:
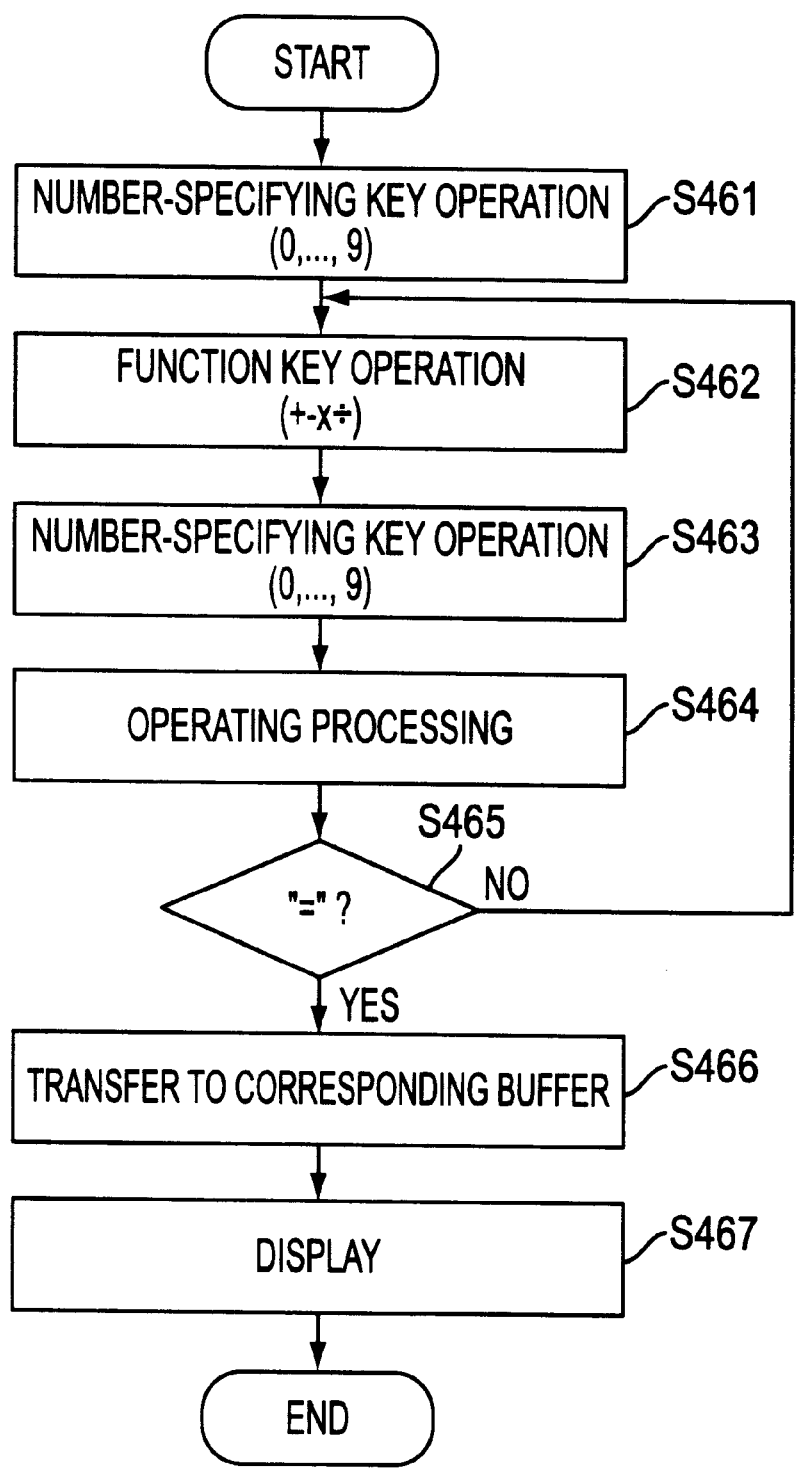
FIG. 23 is a flowchart showing an outline of the calculator program.
Figure 24:
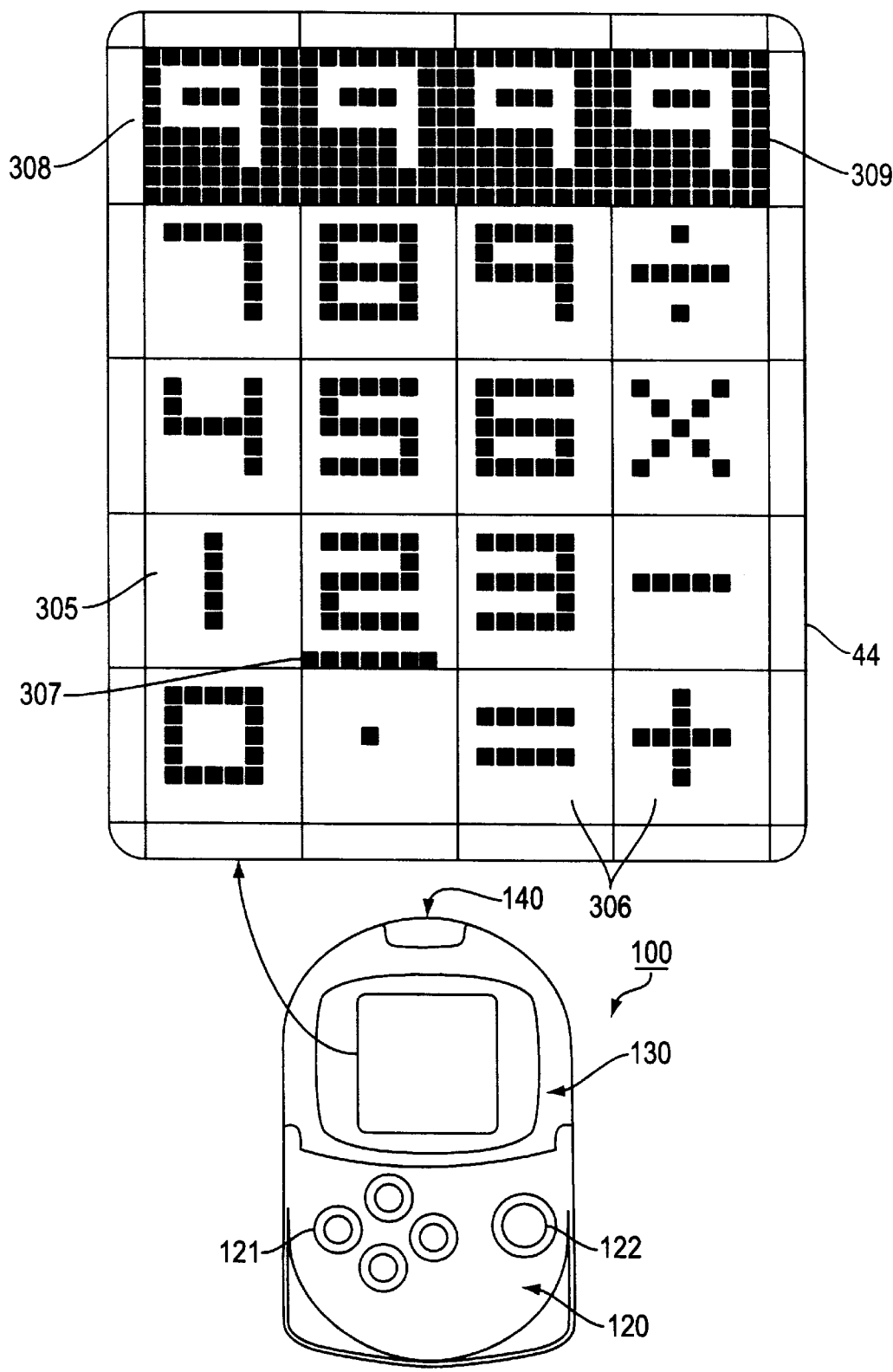
FIG. 24 is a diagram showing the child machine's display device and display content.

Next, referring to FIG. 24, we describe, using FIG. 23, the procedure for using a calculator that makes use of the child machine of this embodiment.

In step S461, the number-specifying key operation is done for inputting the number to be operated on. FIG. 24 is a diagram showing this state. It represents the screen displayed on liquid crystal display unit 44 of child machine 100, and displayed on the display unit screen are number-specifying keys 305 and operation keys 306. In operating the number-specifying keys, one determines the specified number by operating multiple (four, in the diagram) operation buttons 121 of the child machine to move cursor 307 up, down, left, or right onto the desired number-specifying key, then pressing operation button 122. By repeating this operation multiple times, one inputs a specified number of the desired number of digits. This number to be operated on that has been input is displayed in calculation result, etc. display region 309 in white characters on a black background (display-reversal graphics).

In step S462, function key (operation key) operation is done. The procedure for operation of the function keys is the same as for operation of the number-specifying keys described above.

In step S463, operation of number-specifying keys to input the operand is done. This operation procedure for the number-specifying keys of the operand is the same as for operation of the number-specifying keys of the number to be operated on. The number to be operated on that has been input is displayed in reversed graphics in the calculation result, etc. display region. The calculation results until this time are stored in a register.

In step S465, it is decided whether the equal function key has been pressed. If NO, the calculation result stored in register 302 is taken as the number to be operated on, and the function key operation of step S462 is continued.

If the equal function key is pressed, the calculation result stored in register 302 is sent to control means 41. Based on the calculation result, control means 41 displays the calculation result is reverse graphics in calculation result, etc. display region 309 of liquid crystal display device 44.

Display of reverse graphics is done by reading out into program memory 41a the reverse graphic data in the calculator program downloaded into nonvolatile memory 46, and reversing each dot of the liquid crystal display device by video memory (VRAM) that controls the liquid crystal display device.

By displaying number specification 305 in black on a white background and displaying only calculation result 309 in white on a black background as shown in FIG. 24, one can clearly distinguish them from other number-specifying keys, etc., even if the number to be operated on, the operand, and the calculation result are displayed in sequence on the display device of a child machine of relatively small size.

Next, another feature of a calculator that makes use of this child machine will be described. In general, it is desired that such a portable electronic device be of small size. Therefore liquid crystal display device 44 that is arranged on part of it is also of course of very small size.

On a liquid crystal display device of such a very small size, it is sometimes difficult to display the number-specifying keys and operation keys, etc. needed as a calculator in a size that is big enough to distinguish them at a glance.

For example, suppose the liquid crystal display device is 32×32 dots and each character of the number-specifying keys and operation keys uses 8×8 dots. In this case, the number of characters that can be displayed on one screen of the display device comes to 4×4 characters.

But even if it is a basic calculator, it is necessary to display a total of 20 characters: the 10 characters "0" through "9" as number-specifying characters, the 6 characters "=", ".", and the operation keys for the four basic arithmetic operations, and the 4-place characters by which the calculation result, etc. is successively displayed. In addition, as necessary, it may be necessary to accommodate memory keys "M+" and "M−", memory recall key "MR", and operation keys "%" and "<square root symbol>".

Figure 25:
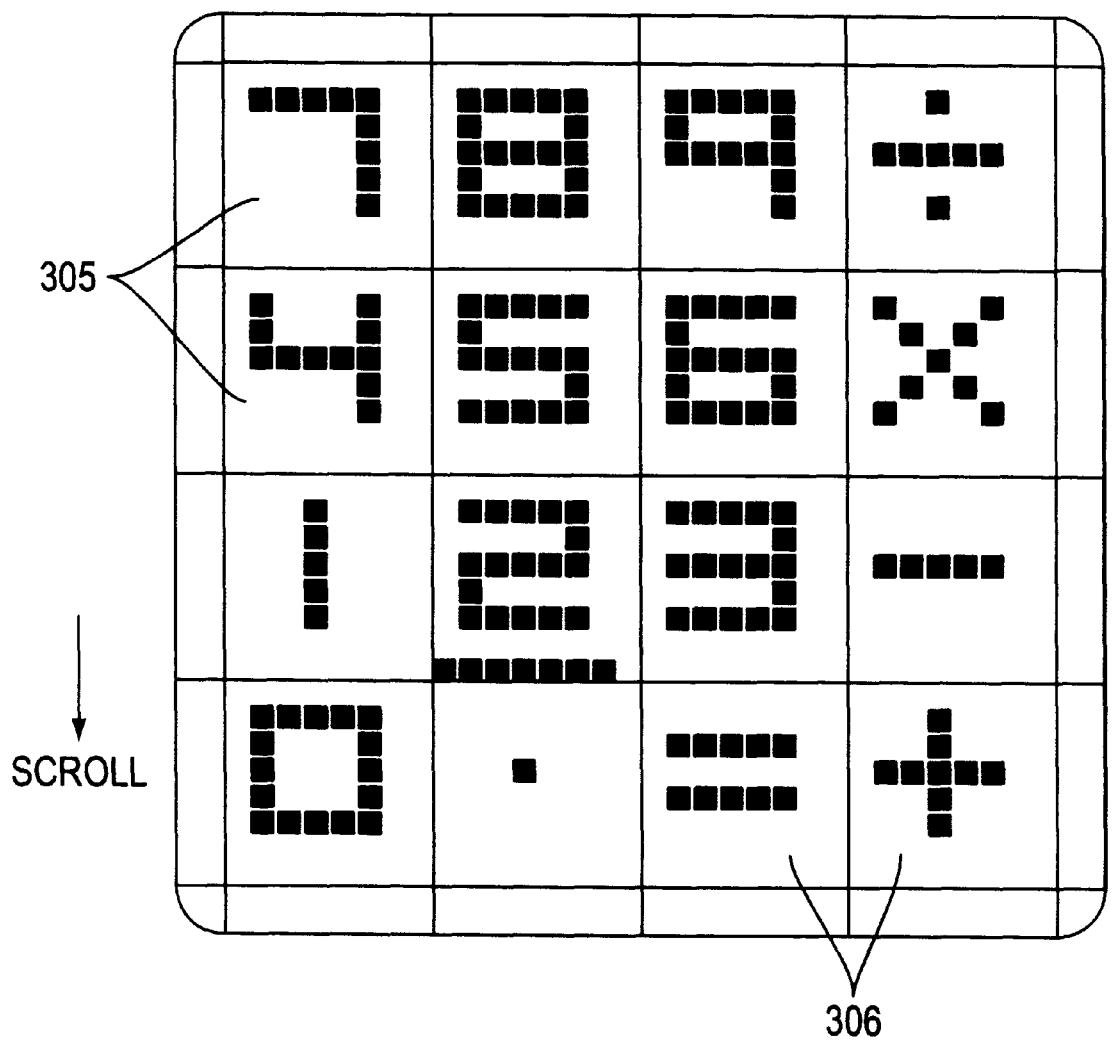
FIG. 25 is a diagram that explains the scrolling operation of the child machine's display device and display content.
Figure 26:
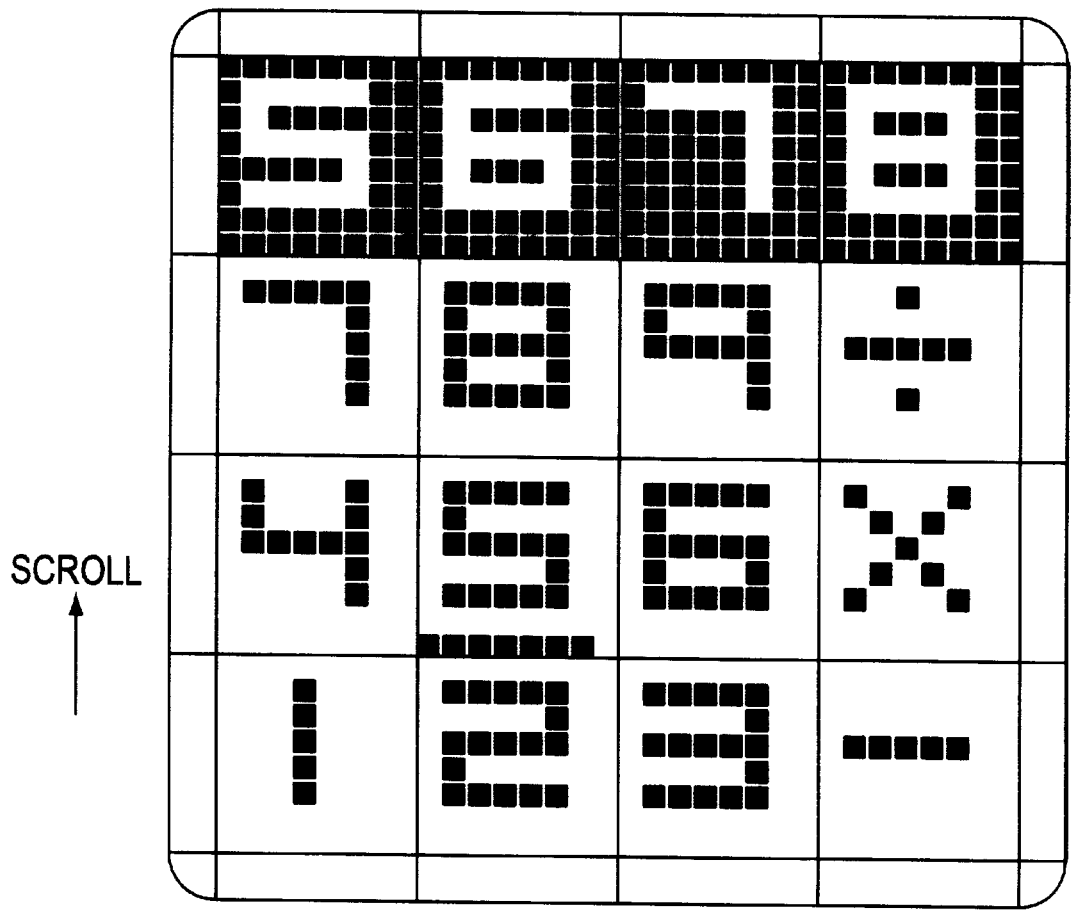
FIG. 26 is a diagram that explains the scrolling operation of the child machine's display device and display content in another direction.

Therefore it is made possible to shift or scroll the display screen on the display device of the child machine of this embodiment. For example, as shown in FIG. 25, during the calculation the screen is scrolled downward to display only number-specifying keys 305 and operation keys 306, with calculation results, etc. display region 308 disappearing off the top of the screen Next, if the calculation result is to be displayed as shown in FIG. 26, the screen is scrolled upward, bringing calculation results, etc. display region 308 onto the screen. This scrolling operation is done using the four operation buttons 121 of the child machine.

Such screen scrolling and screen shifting can be done by various methods. For example, it can be done using the shift registers of the microprocessor of control means 41 of the child machine.

Also, the screen shifting (scrolling) is not limited to the up-down direction. If the number of number-specifying keys and operation keys is increased, or if each character is to be displayed in larger size, shifting may be done in the left-right direction. In order to allow the screen thus to be shifted left and right, it suffices to reserve in the calculator program to be previously downloaded enough memory region for a calculator operation keyboard corresponding to the number-specifying keys, operation keys, and calculation result region, to use part of it for the display region, and to be able to shift the display region by means of the operation buttons.

With the portable electronic device of this invention, in addition to the functions of a conventional memory card used as an auxiliary memory device for information devices, etc., because it is configured so as to have an operation input means for operating a stored program, a display means that displays various information in accordance with said program, a wireless communication means that sends and receives data with other memory cards, etc., and a battery that supplies power to the aforesaid parts, it is possible to provide a memory card that not just stores data but can also independently execute a downloaded application program The present invention provides technology for utilizing as a calculator a portable electronic device that can be connected to a parent machine and can also be used individually as a child machine.

What is claimed is:

1. A portable electronic device that has an interface for connecting to a parent machine which has a program execution function, comprising:

a program storage means, a control means that controls execution of a program;

a display means that displays information in accordance with said executed program;

an operation input means for operating said program, and a power supply means that supplies power to each of said means, wherein said program storage means stores information accompanying the execution of a calculator program that is transferred from the parent machine to the portable electronic device, and control means executes the calculator program stored in said program storage means based on the transferred information.

2. The portable electronic device as described in claim 1, wherein the calculator program stored in said program storage means is executed in a state in which the connection with the parent machine is severed.

3. The portable electronic device as described in claim 1, wherein said connected parent machine is a video game device, said calculator program is downloaded from the connected parent machine to said storage means, and said program is executed by said control means.

4. The portable electronic device as described in claim 1, wherein said calculator program is recorded additionally the optical disk recording medium on which game software is accumulated and which is mounted on said parent machine.

5. The portable electronic device as described in claim 1, wherein characters of the number-specifying keys and operation keys and the numerical value characters of the calculation results are displayed on said display means and are distinguishable.

6. The portable electronic device as described in claim 5, wherein the characters of the number-specifying keys and operation keys are displayed on said display means normally, while the numerical value characters of said calculation results are displayed in characters whose intensity is reversed.

7. The portable electronic device as described in claim 1, wherein number-specifying keys, operation keys, and calculation results are displayed partially on a relatively small display screen of said display means, and the entire view is displayed successively by scrolling said partial display.

8. A method of operating a portable electronic device that has an interface for connecting to a parent machine which has a program execution function, comprising the steps of storing a calculator program that is transferred from a recording medium of the parent machine;

executing said calculator program; and displaying calculator information in accordance with said executed program.

9. The method as described in claim 8, wherein in said displaying step characters of the number-specifying keys and operation keys and characters of the calculation results are distinguishable.

10. The method as described in claim 8, wherein in said displaying step the characters of the number-specifying keys and operation keys are displayed normally, while the numerical value characters of said calculation results are displayed in characters whose intensity is reversed.

11. The method as described in claim 8, wherein in said displaying step the number-specifying keys, operation keys, and calculation results are displayed partially on a relatively small display screen of said display means, and the entire view is displayed successively by scrolling said partial display.

12. A recording medium that is mounted on a parent machine having a program execution function and that records information that can be transferred to a portable electronic device which can be connected to the parent machine, including a transfer program for transferring a program from a parent machine to a portable electronic device, a menu display program, and a calculator program are recorded thereon.

13. The recording medium as described in claim 12, which is an optical disk on which game software is recorded, and said transfer program, menu display program, and calculator program are recorded in addition to said game software.

* * * * *